United States Patent [19]

Lambregts

[11] Patent Number: 4,536,843
[45] Date of Patent: Aug. 20, 1985

[54] TOTAL ENERGY BASED FLIGHT CONTROL SYSTEM

[75] Inventor: Antonius A. Lambregts, Issaquah, Wash.

[73] Assignee: The Boeing Company, Seattle, Wash.

[21] Appl. No.: 454,205

[22] PCT Filed: Sep. 30, 1982

[86] PCT No.: PCT/US82/01388

§ 371 Date: Sep. 30, 1982

§ 102(e) Date: Sep. 30, 1982

[87] PCT Pub. No.: WO84/01345

PCT Pub. Date: Apr. 12, 1984

[51] Int. Cl.³ .............................................. B64C 13/00
[52] U.S. Cl. ................................... 364/434; 364/440; 244/181; 244/182
[58] Field of Search ............... 364/432, 434, 435, 440, 364/424, 176, 427; 244/175, 177, 181, 180, 178

[56] References Cited

U.S. PATENT DOCUMENTS

| Re. 31,159 | 2/1983 | Sicre | 364/427 |
|---|---|---|---|
| 3,496,769 | 2/1970 | Vietor | 73/178 |
| 3,691,356 | 9/1972 | Miller | 364/427 |
| 3,748,900 | 7/1973 | Lindquist | 364/424 |
| 3,774,017 | 11/1973 | Zagalsky | 244/182 |
| 3,789,661 | 2/1974 | Melsheimer | 73/178 |
| 3,901,466 | 8/1975 | Lambregts | 244/182 |
| 3,927,306 | 12/1975 | Miller | 364/427 |
| 3,945,593 | 3/1976 | Schäzer | 244/181 |
| 3,958,107 | 5/1976 | Edelson et al. | 364/442 |
| 3,989,208 | 11/1976 | Lambregts | 244/182 |
| 4,127,249 | 11/1978 | Lambregts | 364/424 |
| 4,189,119 | 2/1980 | Peter-Contesse | 244/182 |
| 4,209,152 | 6/1980 | Stephan | 364/442 |
| 4,277,041 | 7/1981 | Marrs et al. | 364/431 |

FOREIGN PATENT DOCUMENTS 2250747 10/1982 Fed. Rep. of Germany.

Primary Examiner—Edward J. Wise
Assistant Examiner—Thomas G. Black
Attorney, Agent, or Firm—James P. Hamley; Bernard A. Donahue

[57] ABSTRACT

An integrated aircraft longitudinal flight control system uses a generalized thrust and elevator command computation (38), which accepts flight path angle, longitudinal acceleration command signals, along with associated feedback signals, to form energy rate error (20) and energy rate distribution error (18) signals. The engine thrust command is developed (22) as a function of the energy rate distribution error and the elevator position command is developed (26) as a function of the energy distribution error. For any vertical flight path and speed mode the outerloop errors are normalized (30, 34) to produce flight path angle and longitudinal acceleration commands.

The system provides decoupled flight path and speed control for all control modes previously provided by the longitudinal autopilot, autothrottle and flight management systems.

52 Claims, 9 Drawing Figures

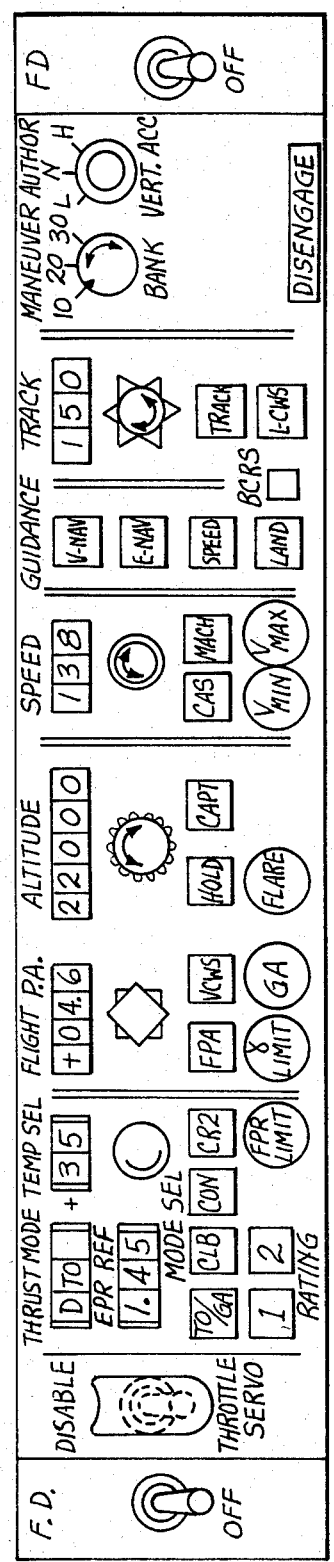
Fig. 4  INTEGRATED MODE CONTROL PANEL USING TOTAL ENERGY CONTROL CONCEPT
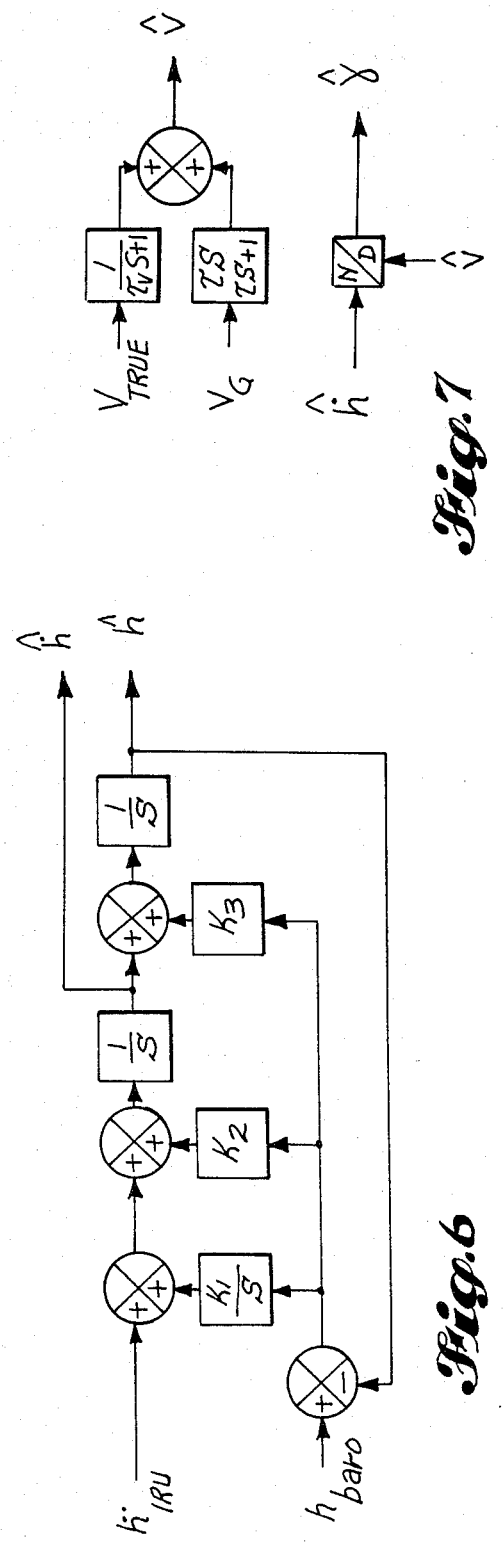
Fig. 6
Fig. 7

TOTAL ENERGY BASED FLIGHT CONTROL SYSTEM

BACKGROUND OF THE INVENTION

The invention described herein was made in part in the performance of work under a NASA contract No. NAS1-14880 and is subject to the provisions of Section 305 of the National Aeronautics and Space Act of 1948, Public Law 85-568 (72 Stat. 435; 42 USC 2457).

This invention pertains to the aircraft automatic flight control art and, more particularly, to an integrated longitudinal flight control system based on total aircraft energy.

Numerous autopilot, autothrottle and flight guidance systems for use in aircraft flight control have been developed in the prior art. Such systems have often evolved in a piecemeal fashion and, particularly with respect to longitudinal axis flight control, such automatic control systems are characterized by a proliferation of control laws and hardware components. As a result, these systems are overly complex and lacking in functional integration. This has caused numerous operational and performance deficiencies, such as:

low reliability and availability,
high procurement and maintenance costs,
excessive number of sensors,
undesirable flight path and speed control coupling,
command capture overshoots and poor tracking,
excessive controller activity and turbulence resulting in poor ride quality, engine wear and waste of fuel,
loss of speed control when thrust limits,
mode switching transients,
inadequate stall/overspeed protection, and
unsatisfactory performance in windshear.

There is a long felt need in the flight control art, therefore, for a fully integrated vertical flight path and speed control system which, by developing fundamental solutions to the problem of fully coordinated elevator and throttle control, is capable of a performance level which overcomes these limitations of flight control systems known in the prior art.

SUMMARY OF THE INVENTION

It is an object of this invention, therefore, to provide an improved automatic longitudinal flight control system in which the aforementioned performance and operational deficiencies are avoided.

Another objective of this invention is to provide a universal multi-input/output longitudinal control system, with appropriately coordinated elevator and throttle commands to provide consistent, accurate, decoupled control over the aircraft's vertical flight path and speed, in any desired combination of modes and flight condition.

It is a further objective of this invention to provide the above-mentioned automatic longitudinal flight control system characteristics, using basic principles of physics and control theory, in particular, the use of thrust to control the total energy state of the aircraft and the use of elevator position to control the energy distribution.

Yet another major objective of this invention is to provide a dramatic simplification in the overall automatic control system in terms of required hardware and software, by systematic integration of all control requirements, elimination of unnecessary duplication of functions and establishment of priority use of controllers. As a result, the presently disclosed system not only realizes major improvements in automatic control system performance and operational capabilities, but also improvements in safety by preventing aircraft stall, overspeed and engine overboost, and cost of ownership by simplifying system development, certification and maintenance.

Briefly, according to the invention, the aircraft vertical flight path and speed targets are normalized into vertical flight path angle and longitudinal acceleration command signals $\gamma_c$ and $V_c$ respectively. These commands are combined with their corresponding feedback variables $\gamma$ and $V$ to form the error signals nd $\gamma_\epsilon$ which, in turn, are used to produce signals representative of the specific total energy rate error $\dot{E}_{s\epsilon}$ $$\dot{E}_{s\epsilon} = \gamma_\epsilon + \dot{V}_\epsilon/g,  \quad (1)$$

and the energy rate distribution error D $$\dot{D}_\epsilon = -\gamma_\epsilon + \dot{V}_\epsilon/g,$$

relative to the aircraft's vertical flight path and speed targets. In (1) and (2), g is a constant representing acceleration due to gravity.

The specific total energy rate error $\dot{E}_{s\epsilon}$ is controlled to zero by commanding incremental thrust as a function of the $\dot{E}_{s\epsilon}$ signal, while the energy distribution rate error $\dot{D}_\epsilon$ is controlled to zero by commanding an incremental elevator position as a function of the $\dot{D}_\epsilon$ signal, thereby driving the aircraft to the desired vertical flight path and speed targets.

BRIEF DESCRIPTION OF THE DRAWINGS

FIG. 4 is an exemplary layout of a mode control panel for selection and indication of various modes and commands.

FIG. 6 illustrates a third order filter providing inertially smoothed altitude and altitude rate signals.

FIG. 7 is a block diagram showing the first order filter, providing a filtered airspeed signal and a filtered airmass referenced flight path angle signal.

DETAILED DESCRIPTION OF THE PREFERRED EMBODIMENT OF THE INVENTION

Figure 1:
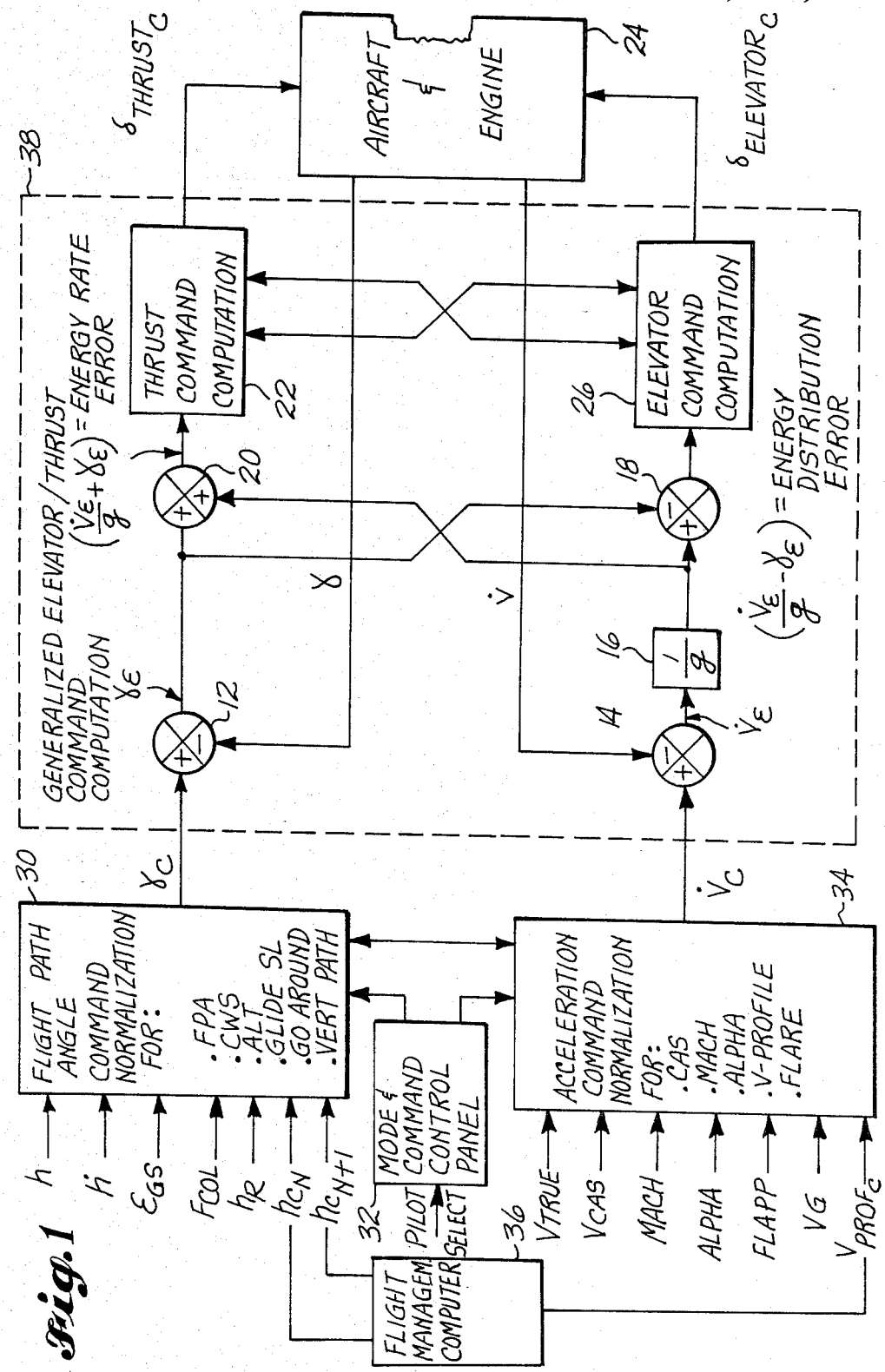
FIG. 1 illustrates, in block diagram form, the overall Total Energy Control System architecture with various system inputs, mode and command controls, as well as the generalized thrust and elevator command computation providing decoupled flight path and speed control.

The overall design philosophy of the present flight control system is to compute the aircraft's total energy state and desired state, as represented by flight path, speed and associated targets, and control the total energy error with thrust, while using the elevator to control the energy distribution error between the flight path and speed. For all flight conditions, thrust is the most effective means to change the aircraft's energy state, whereas elevator control provides an effective means to modulate energy distribution and stabilize the aircraft's attitude.

The total energy E of an aircraft is given by:

$$(3) \quad E = Wh + 1/2 \frac{WV^2}{g},$$

where
g = acceleration due to gravity,
h = altitude,
V = longitudinal velocity, and
W = aircraft weight.

From the above, assuming constant weight:

$$(4) \quad \dot{E} = W\left(\dot{h} + \frac{V\dot{V}}{g}\right)$$

or $$(5) \quad \frac{\dot{E}}{V} = W\left(\gamma + \frac{\dot{V}}{g}\right)$$

where $\gamma = \dot{h}/V$.

Thus, at a given speed, the rate of change of the aircraft's energy is dependent only upon the flight path angle $\gamma$ and longitudinal acceleration $\dot{V}$. From the longitudinal equation of motion $$(6) \quad \frac{W}{g} \dot{V} = T - D - W\sin\gamma$$

where
T = total thrust,
D = drag,
it follows that $$(7) \quad W\left(\gamma + \frac{\dot{V}}{g}\right) = (T - D) \quad (\gamma \text{ assumed small}).$$

Thus the aircraft's rate of change of energy is proportional to the difference between thrust and drag. The required thrust is $$(8) \quad T_{required} = \left(\gamma + \frac{\dot{V}}{g}\right) W + D = \dot{E}/V + D$$

$$= \dot{E}_s W/V + D$$

where $\dot{E}_s$ represents the specific energy rate of the aircraft.

For commercial aircraft drag is affected short term mainly by configuration changes. Thus, at a given speed and drag configuration the required incremental thrust is directly proportional to aircraft weight and the sum of the incremental flight path angle and longitudinal acceleration. Conversely, at a specific thrust level it is possible to trade flight path angle for acceleration and vice versa using the elevator control only.

Given that it is desired to change from a present flight path angle $\gamma$ to a commanded flight path angle $\gamma_c$ and/or that the longitudinal acceleration is to be changed from a present value $\dot{V}$ to a commanded value $\dot{V}_c$, from the above analysis it becomes apparent that a universal flight path and speed control concept is obtained when the engine throttles are driven until the total specific energy rate error $$(9) \quad \dot{E}_{s\epsilon} = \gamma_\epsilon + \frac{\dot{V}_\epsilon}{g}$$

where $$\dot{V}_\epsilon = \dot{V}_c - \dot{V}$$

$$\gamma_\epsilon = \gamma_c - \gamma$$

relative to the target flight path and acceleration is zero; the elevator is driven until the energy rate distribution error $$(10) \quad \dot{D}_\epsilon = -\gamma_\epsilon + \frac{\dot{V}_\epsilon}{g}$$

relative to the target flight path and acceleration is zero.

This control concept can be applied for any combination of specific speed and flight path control modes and at any flight condition.

FIG. 1, blocks 38 and 24, illustrates circuitry for realizing the above control concept. Thus, an input command flight path angle signal $\gamma_c$ is applied as one input to a summer 12. Also fed to summer 12 is a signal $\gamma$ corresponding to the aircraft's actual flight path angle. The summer 12 produces at its output a flight path error signal $\gamma_\epsilon$ which is equal to the difference between the commanded flight path angle and the actual flight path angle.

In a similar manner, the aircraft's longitudinal acceleration signal $\dot{V}$ is subtracted from the commanded longitudinal acceleration $\dot{V}_c$ in a summer 14. An amplifier 16 multiplies the resulting $\dot{V}_\epsilon$ error signal by a fixed gain 1/g, producing an output signal $\dot{V}_\epsilon/g$ which is fed to inputs of summers 18 and 20. Also coupled as inputs to summers 18 and 20 is the signal $\gamma_\epsilon$. The output signal from summer 20, which is of the form $\dot{E}_{s\epsilon} = \gamma_\epsilon + \dot{V}_\epsilon/g$ is the above derived total energy rate error signal, whereas the output of summer 18 is of a form $\dot{D}_\epsilon = -\gamma_\epsilon + \dot{V}_\epsilon/g$, shown to be the energy rate distribution error.

The specific energy rate error signal $\dot{E}_{s\epsilon}$ is applied to thrust command computation circuitry 22 which generates a thrust command signal $\delta_{THRUSTc}$.

The signal $\delta_{THRUSTc}$ controls engine thrust, at block 24, thereby reducing the energy rate error signal to zero.

In a similar manner, the energy rate distribution error signal $D_\epsilon$ is fed to the elevator command computation circuitry 26, which circuitry responds by producing an elevator control command signal $\delta_{elevatorc}$. This signal, when coupled to the aircraft's elevator at block 24, reduces the energy rate distribution error signal to zero. In the above manner, the aircraft is precisely guided from its present flight path angle and acceleration to the desired flight path angle and acceleration.

Frequently it is desired to control the aircraft to altitude and speed targets rather than to flight path angle and acceleration targets. In that case, a simple process, represented by blocks 34 and 30 of FIG. 1, is used to normalize the command and feedback signals of the selected flight path and speed mode into the standard $\dot{\gamma}_c$ and $\dot{V}_c$ signals. The air speed error is multiplied by a suitable gain $K_v$ to form the acceleration command:

$$\dot{V}_c = K_v V_\epsilon \text{ and } \dot{V}_\epsilon = K_v V_\epsilon = \dot{V}. \tag{11}$$

Also, the altitude error is multiplied by a suitable gain factor $K_h$ to form the vertical speed command $\dot{h}_c = K_h h_\epsilon$. The gain $K_h$ is selected equal to $K_v$ to yield identical altitude and speed dynamics. Subsequently the vertical speed command is divided by the aircraft's speed V to form the flight path angle command:

$$(12)\ \gamma_c = \frac{\dot{h}_c}{V} = \frac{K_h h_\epsilon}{V}$$

and $$\gamma_\epsilon = \frac{K_h h_\epsilon}{V} - \gamma.$$

The altitude and speed errors are thus scaled in relative energy terms.

Given the above signal normalization, the flight path angle and longitudinal acceleration commands can be developed for each of the longitudinal autopilot and autothrottle modes to couple into the generalized total energy based thrust and elevator command processor. The resulting overall automatic control system architecture is illustrated in FIG. 1. The system encompasses four major signal processing blocks. Block 38 represents the previously described generalized thrust and elevator command computation. Block 32 represents the mode select and command control panel providing signals to blocks 30 and 34 specifying the pilot selected modes of operation as well as the command targets. Block 30 represents the flight path angle command normalization processing, receiving input signals of barometric altitude and altitude command for control in the ALTITUDE mode, radio altitude for control in the FLARE mode, barometric altitude and altitude commands for control in the VERTICAL PATH mode, flight path angle command for control in the FLIGHT PATH ANGLE mode, column force for control in the CONTROL WHEEL STEERING (CWS) mode and flight path angle command for the GO AROUND mode. Similarly, acceleration command normalization block 34 receives signals representing true airspeed, calibrated airspeed and calibrated airspeed command for control in the CAS mode, Mach number and Mach command for control in the MACH mode, groundspeed and groundspeed command for control in the SPEED PROFILE mode, providing time based flight path control (4D) capability. The VERTICAL PATH and SPEED PROFILE modes provide the capability to link up with a flight management computer 36 for receiving and controlling the aircraft to optimal flight path and speed profiles, as determined by the flight management computer based on consideration of aircraft operating economics and/or air traffic control.

Figure 5A:
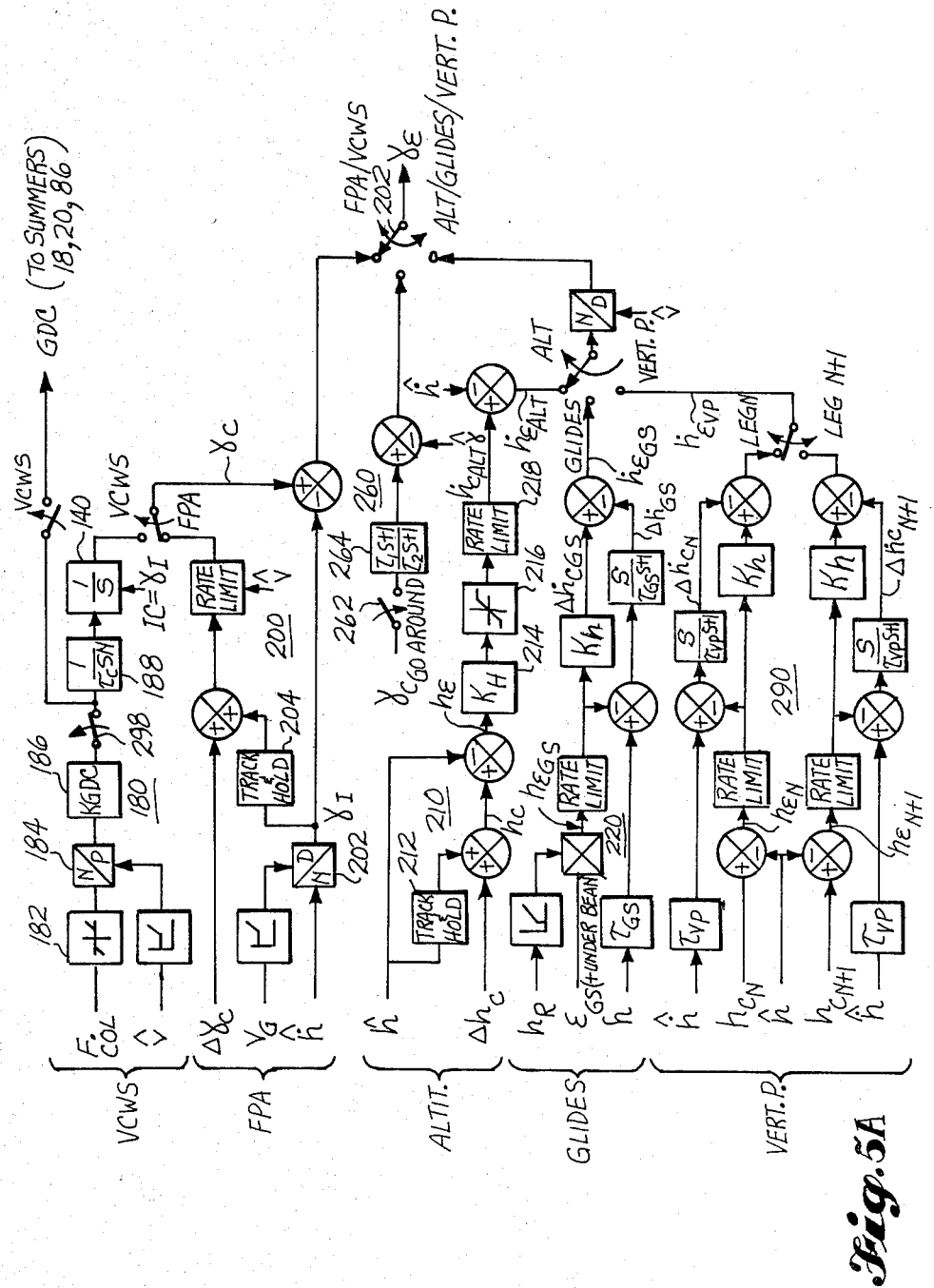
FIGS. 5a and 5b are block diagrams illustrating actual implementation of the various control modes.
Figure 5B:
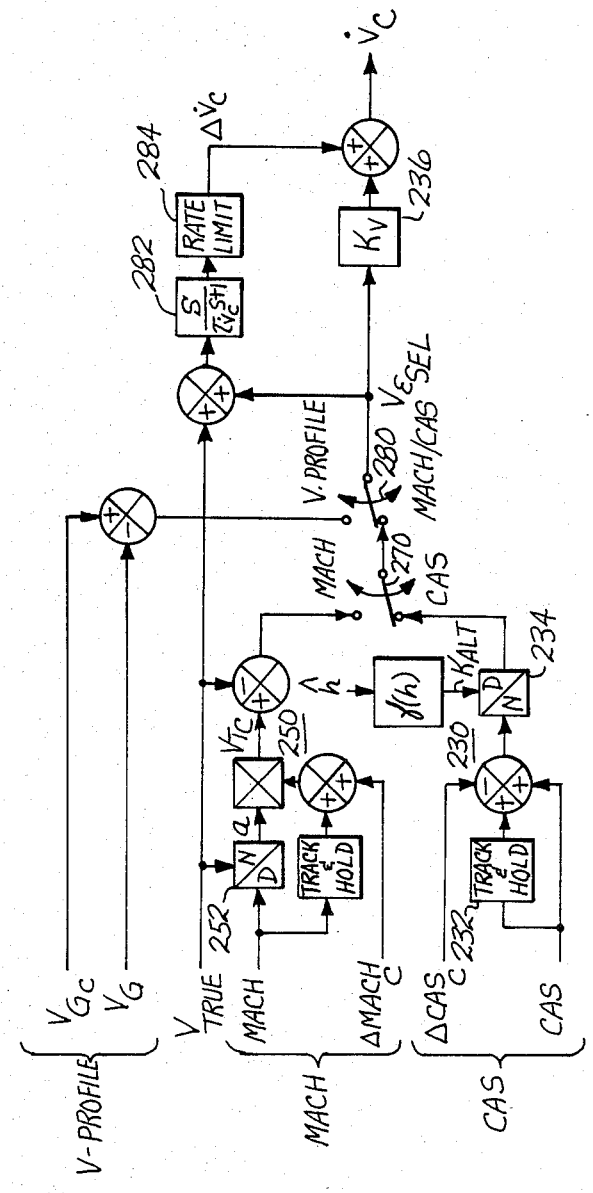

The mode and command control panel, an example of which is shown in FIG. 5, allows selection of any one of the path modes in combination with any one speed control mode. In all cases, the output signal from block 30 of FIG. 1 is the normalized flight path angle command signal $\gamma_c$, while the output from block 34 is the normalized longitudinal acceleration command signal $\dot{V}_c$. The two command signals $\gamma_c$ and $\dot{V}_c$ are fed to the control system 38. In this manner, any desired autopilot or autothrottle mode may be implemented to utilize the above-described generalized energy rate error and energy rate distribution error control law.

Figure 2:
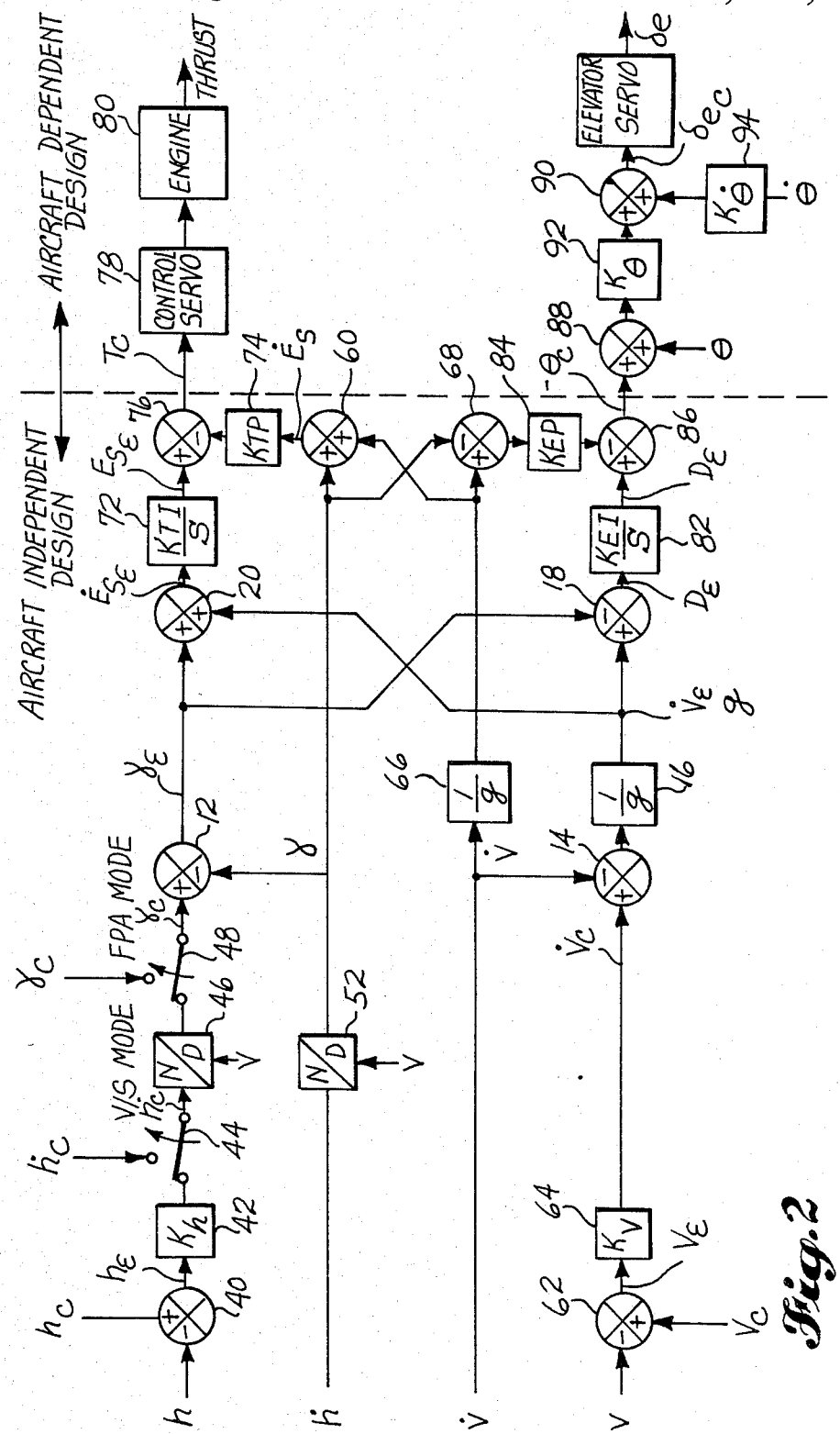
FIG. 2 is a block diagram illustrating signal processing details for the system shown in FIG. 1.

FIG. 2 is a more detailed representation of the system shown in FIG. 1 and illustrates implementation of the energy based control system for the basic command modes of altitude, vertical speed, flight path angle and longitudinal velocity. In the ALTITUDE control mode the altitude signal h from an altitude sensing means, and the pilot selected altitude command $h_c$ from the mode control panel are combined in summer 40 to form the altitude error signal $h_\epsilon$, which is multiplied by a factor $K_h$ in amplifier 42 to produce at its output effectively a vertical speed command signal: $\dot{h}_c = K_h h_\epsilon$. In the VERTICAL SPEED mode the pilot selected vertical speed command signal $\dot{h}_c$ is taken directly from the mode control panel. The vertical speed command signal $\dot{h}_c$, selected by switch 44 from either the ALTITUDE or VERTICAL SPEED mode, is normalized into a flight path angle command signal $\gamma_c$ by dividing it by a signal representing the aircraft's velocity V, utilizing divider 46.

In the FLIGHT PATH ANGLE control mode, the pilot selected flight path angle command signal $\gamma_c$ is taken directly from the mode control panel. The appropriate $\gamma_c$ signal, the source of which is selected by means of switch 48 depending on the mode selected by the pilot, is routed to summer 12. Also applied to summer 12 is a signal representative of the actual flight path angle $\gamma$, which is derived by dividing a signal representative of the aircraft's vertical velocity $\dot{h}$ by the longitudinal velocity signal V, utilizing divider circuit 52. Means for providing vertical and longitudinal velocity signals are commonly known in the flight control art. In summer 12 the flight path angle signal $\gamma$ is subtracted from the flight path angle command signal $\gamma_c$ to form the flight path angle error signal $\gamma_\epsilon$.

In a similar manner a velocity error signal $V_\epsilon$ is formed in summer 62 by subtracting the signal V representing the actual longitudinal velocity from the pilot selected velocity command signal $V_c$. The velocity error signal $V_\epsilon$ is normalized by multiplying it with the gain factor $K_v$ in amplifier 64 to form the acceleration command signal: $\dot{V}_c = K_v V_\epsilon$.

In summer 14 the signal $\dot{V}$, representing the actual longitudinal acceleration and provided by means commonly known in the flight controls art, is subtracted from the acceleration command signal $\dot{V}_c$ to form the acceleration error signal $\dot{V}_\epsilon$. This $\dot{V}_\epsilon$ signal, and also the $\dot{V}$ signal, is scaled by the gain factor 1/g in amplifiers 16 and 66, respectively, to form the energy rate related signals $\dot{V}_\epsilon/g$ and $\dot{V}/g$ (g is the gravity constant).

In summer 20 the flight path angle error signal $\gamma_\epsilon$ and the scaled acceleration error signal $\dot{V}_\epsilon/g$ are added to form the specific total energy rate error signal:

$$(13)\ \dot{E}_{s\epsilon} = \gamma_\epsilon + \dot{V}_\epsilon/g$$

$$= (\gamma_c - \gamma) + (\dot{V}_c - \dot{V})/g$$

which for the altitude and speed control modes is developed as $$(14)\ \dot{E}_{s\epsilon} = (K_h h_\epsilon/V - \gamma) + (K_V V_\epsilon - \dot{V})/g$$

$$= \{K_h(h_c - h)/V - \gamma\} + \{K_V(V_c - ) - \dot{V}\}/g.$$

In summer 18 the flight path angle error signal $\gamma_\epsilon$ is subtracted from the scaled acceleration error signal $\dot{V}_\epsilon/g$ to form the energy rate distribution error signal:

$$(15) \quad \dot{D}_\epsilon = -\gamma + \dot{V}_\epsilon/g$$
$$= -(\gamma_c - \gamma) + (\dot{V}_c - \dot{V})/g$$

which for the altitude and speed modes is developed as $$(16) \quad \dot{D}_\epsilon = -\{K_h(h_c-h)/V - \gamma\} + \{K_V(V_c-V) - \dot{V}/g.\}$$

In the altitude and speed control modes the flight path angle command $\gamma_c = K_h h_\epsilon / V$ and acceleration command $\dot{V}_c = K_V V_\epsilon$ are proportional to the altitude error $h_\epsilon$ and speed error $V_\epsilon$ respectively. Thus, the gains $K_h$ and $K_V$ essentially determine the altitude and speed error decay time constants and by selecting $K_V = K_h$ the altitude and speed dynamics resulting from this energy control will be identical.

The main thrust command signal is formed by integration of the specific energy rate error signal $\dot{E}_{s\epsilon}$ from the output of summer 20, utilizing the integrator 72. Thus, the output from integrator 72 is a signal proportional to $E_{s\epsilon}$, which incrementally represents the specific energy error:

$$(17) \quad E_{s\epsilon} = \frac{\dot{E}_{s\epsilon}}{S} = \frac{\gamma_\epsilon + \dot{V}/g}{S}.$$

The steady value of the output of integrator 72 corresponds to the thrust command required for trimmed flight.

For thrust control damping the specific energy rate signal $\dot{E}_s$ is formed in summer 60 by the addition of the flight path angle signal $\gamma$ and the scaled acceleration signal $\dot{V}/g$:

$$\dot{E}_s = \gamma + \dot{V}/g. \quad (18)$$

The specific energy error signal $\dot{E}_{s\epsilon}$ and the specific energy rate signal $\dot{E}_s$ are amplified by suitable gains KTI and KTP respectively in blocks 72 and 74, and combined in summer 76, to form the actual net thrust command signal $T_c$. The engine and throttle servo control blocks 78 and 80 and are configured to make the engine deliver the commanded net thrust.

Similarly, the main elevator command signal is formed by integration of the energy rate distribution error $\dot{D}_\epsilon$ from the output of summer 18, using integrator 82. Thus the output of integrator 82 is a signal proportional to $D_\epsilon$, which incrementally represents the energy distribution error:

$$(19) \quad D_\epsilon = \frac{\dot{D}_\epsilon}{S} = -\frac{\gamma_\epsilon + \dot{V}_\epsilon/g}{S}.$$

The steady state output of integrator 82 corresponds to the elevator command required for trimmed flight.

For elevator control damping the energy distribution rate signal $\dot{D}$ is formed in summer 68 by subtracting the normalized acceleration signal $\dot{V}/g$ from the flight path angle signal:

$$\dot{D} = -\gamma + \dot{V}/g. \quad (20)$$

The signals $D_\epsilon$ and $\dot{D}$ are amplified by suitable gain factors KEI and KEP respectively in blocks 82 and 84 and combined in summer 86 to form the pitch attitude command signal $-\theta_c$. The pitch attitude command signal $-\theta_c$ and the signal $\theta$, representative of the actual pitch attitude, obtained from a commonly available signal source, are combined in summer 88 and amplified by a factor $K_\theta$ in amplifier 92. The output of amplifier 92 is summed in summer 90 with the amplified pitch rate signal $K_{\dot{\theta}}\dot{\theta}$, which is produced at the output of amplifier 94. The resulting output from summer 90 is the final elevator position command signal $\delta_{ec}$ which is applied to the elevator servo control unit to position the elevator.

The pitch attitude and pitch rate feedbacks serve to stabilize and augment the innerloop pitch dynamics of the aircraft so as to coordinate it precisely with the thrust innerloop dynamics.

The present energy based flight control system is, thus, seen to exhibit numerous advantages.

(1) All flight control modes share the same generalized thrust and elevator command signal processing.

(2) The forward feed of flight path and speed commands to both throttle and elevator command processors, using signal normalizations based on energy considerations, provides a mechanism for developing precisely coordinated thrust and elevator commands that decouple the flight path response from speed commands and the speed response from flight path commands.

(3) Since thrust is used only to control the total aircraft energy, flight path perturbation will not induce throttle activity.

(4) All feedback loops, except the extreme outer loops, are "hard-wired" and therefore indentical for each mode, yielding uniform control characteristics for all control modes.

(5) Only the outer loop error feedback signal, which is characteristic for each mode and processed in the integral signal path, is switched. As a result, control switching between each mode is accomplished transient free, without the need for synchronization circuitry and re-initialization of the command integrators.

(6) Step changes in the flight path or speed commands result in initial rate responses of the controllers, making the command capture responses smooth.

(7) Identical outer loop gains $K_h$ and $K_v$ are used to normalize the altitude and speed error signals into energy related errors. As a result, the throttles respond minimally in case of a "zoom" maneuver (simultaneous climb/deceleration command).

(8) The outer loop altitude and vertical speed normalization provides inherent gain scheduling, yielding virtually constant control bandwidth and damping over the entire flight regime.

(9) As a result of the use of a generalized control law processing scheme, duplication of functions is avoided and control law reconfiguration from one mode to another is minimized. As a result, the system's software and hardware demands are sharply reduced compared to previous state-of-the-art systems.

(10) The generalized and integrated speed and flight path control law based on the Total Energy Control concept makes the design largely aircraft independent. Only the innerloop thrust and elevator control need to be designed specifically for each aircraft. Thus, large time and money savings accrue when applying the design to other aircraft.

Additional System Provisions and Features

Figure 3A:
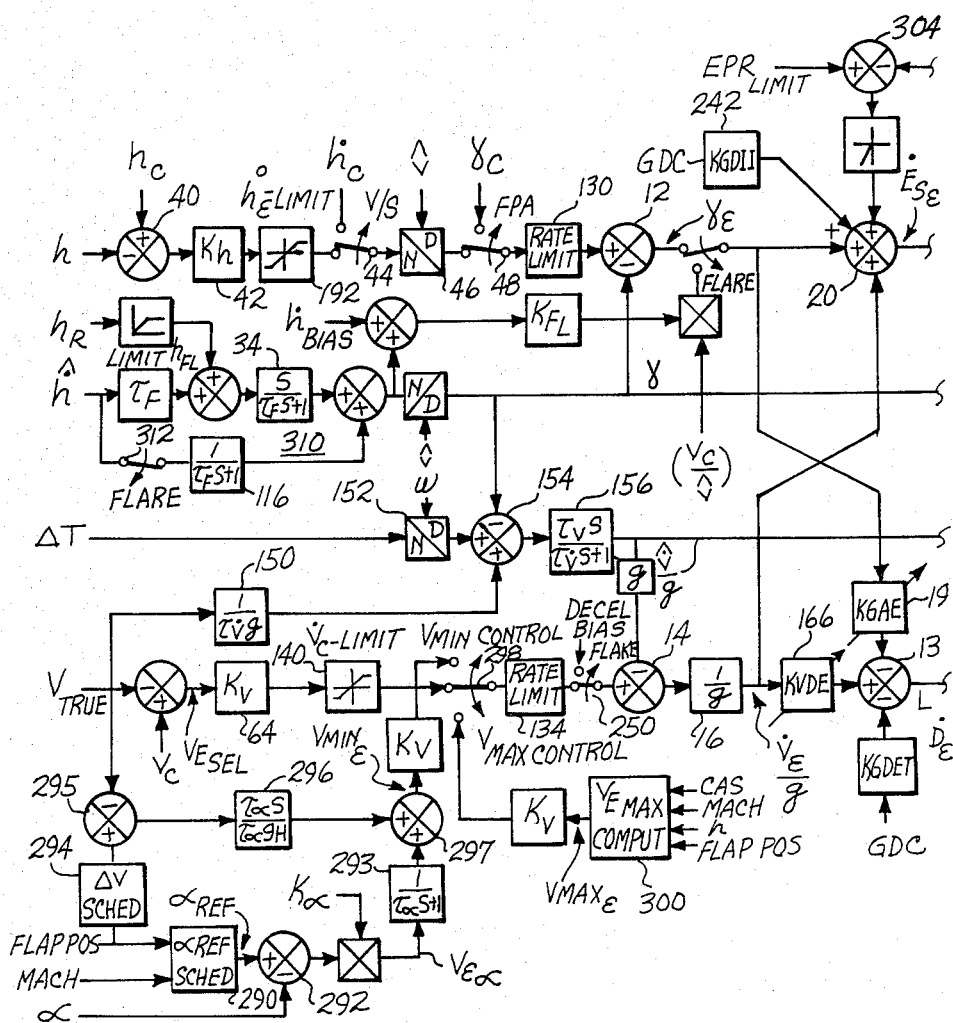
FIGS. 3a and 3b are block diagrams illustrating yet further details of the signal processing of the system shown in FIGS. 1 and 2, involving non-linear system operations.
Figure 3B:
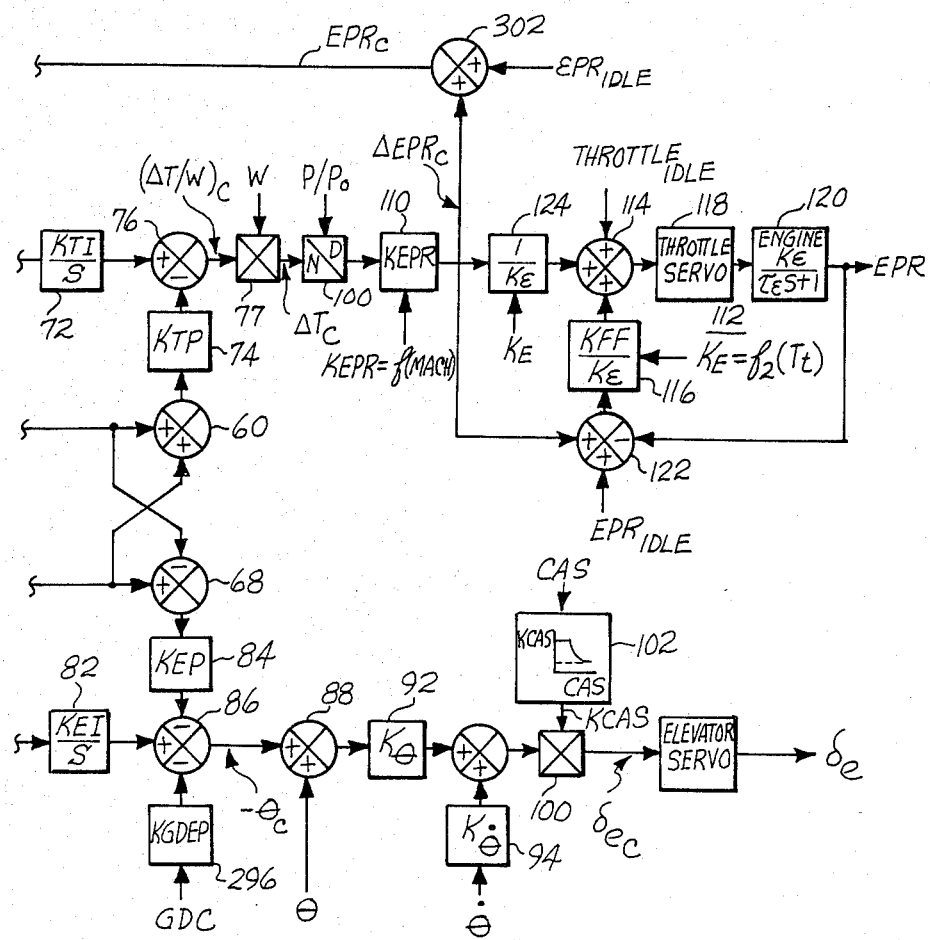

FIG. 3 is a block diagram illustrating further provisions and features of the Total Energy Control System.

Gain Scheduling

As previously discussed, normalization of the altitude error and vertial speed feedback signals provides inherent gain scheduling of the path control outerloop, yielding the desired path control dynamics throughout the flight envelope.

The speed control outerloop does not require gain scheduling.

In the elevator innerloop control, gain scheduling of the elevator command is required to compensate for the increasing elevator effectiveness with increasing speed and maintain uniform dynamics of the augmented pitch attitude responses. Thus, a multiplier 100 scales the elevator command output $\delta_e$ by a gain factor KCAS, using variable gain amplifier 102. KCAS is a function of the calibrated airspeed CAS.

The thrust command is scheduled proportional to aircraft weight to provide the exact net thrust command $\Delta T_c$ that is required to maintain uniform flight path and speed control dynamics with varying aircraft weight. As seen from equation (8), the required incremental thrust is proportional to the sum of the incremental flight path angle and normalized acceleration and also proportional to aircraft weight. Thus, multiplier 77 multiplies the specific thrust command signal output from summer 76 by a signal W which is representative of aircraft weight.

Since the required incremental net thrust command is computed precisely, the engine must be controlled to put out the commanded net thrust. However, the engines are generally controlled by variables other than net thrust, for example throttle position, engine pressure ratio EPR or fan speed $N_1$. The net thrust command is, therefore, converted into the appropriate engine variable—$\Delta EPR_c$ for the example case. To this effect, the net thrust command is first normalized to compensate for the altitude effect on the engine performance by dividing the thrust command, in divider 100, by the altitude pressure ratio factor $\delta = p/p_o$, where p is the actual atmospheric pressure at altitude and $p_o$ is the sea level pressure. Finally, the normalized net thrust command is converted into an engine pressure ratio command, using amplifier 110, with a gain factor $K_{EPR}$ which is generally a function of Mach number.

Although the engine is ultimately controlled to a $EPR_c$ (or $N_{1c}$) command, the actual servo control may use throttle position. In that case, it is necessary to use throttle position as an intermediate control variable. Thus, a control loop, generally indicated at 112, includes a summer circuit 114, and amplifier 116, a position servo 118, the engine 120, a summer circuit 122 and the amplifier 124. The gain of amplifier 124 is the inverse of the engine gain $KE = \Delta EPR/\Delta THROTTLE$ and provides the steady state throttle position command at the input of summer 114 required for a given $\Delta EPR_c$. Thus, in the short term the throttles are controlled to a "predicted" position corresponding to the commanded $\Delta EPR_c$ and fine control of the engine thrust is achieved through the EPR loop. Summer circuit 122 combines the EPR feedback signal from the engine with a signal $EPR_{IDLE}$ representative of the engine pressure ratio at idle and the $\Delta EPR_c$ to form an engine pressure ratio error feedback signal. This approach allows the throttles to go directly to the required steady state position, regardless of the dynamic response lag of the engine, thereby avoiding undesirable throttle position overshoots. The gain of amplifier 116 is made to vary as an inverse function of the engine gain $K_E = \Delta EPR/\delta_{THROTTLE}$, which is mainly a function of total air temperature. Thus, the overall engine control loop gain stays constant, yielding uniform thrust response dynamics for all flight conditions.

Future engines may use electronic engine controls, capable of accepting net thrust or EPR commands exclusively, thereby greatly simplifying the interface with the flight control system.

Thurst Limiting

Most state-of-the-art engines do not feature built-in protection against inadvertently exceeding the engine's operating limits. The Total Energy Control System has, therefore, been designed to safeguard the engines against overboost. The EPR-limit signal is supplied by an EPR-limit computing means. As described above, the engine is controlled to an incremental thrust command $\Delta EPR_c$. In order to limit the engine thrust to an absolute EPR-limit, an absolute command signal $EPR_c$ is formed, as seen in FIG. 3 by the addition of the $EPR_{IDLE}$ signal to the $\Delta EPR_c$ signal in summer 302. If the resulting $EPR_c$ signal exceeds the EPR-limit signal, as determined from the output of summer 304, the difference signal is fed back with high gain into the thrust command integrator 72 so that, in effect, the $EPR_c$ signal remains limited to the EPR-limit. This way, also, overshoots of the throttle position corresponding to the EPR-limit are avoided.

Similar provisions may be used to limit the $\Delta EPR_c$ signal to a desired minimum value and the throttle position command to the desired forward and aft limits.

Speed Limiting

In most previous state-of-the-art automatic flight control systems it has been possible to stall the aircraft through inadvertent operation. For example, in conventional speed control autothrottle systems, it is possible to safeguard against stall, but only to the extent that the required thrust does not exceed the thrust limit. Thus, during climb out with limit-thrust, such autothrottles cannot protect against stall. Likewise, during descent with the thrust at idle, conventional autothrottle systems cannot prevent the actual speed from exceeding the selected speed command or the maximum allowable speed.

Therefore, in the present Total Energy Control System, stall and overspeed protection control has been developed that is foolproof regardless of the selection of automatic control modes. This has been achieved by integration and prioritizing speed control between the selected speed command and the minimum or maximum safe speed, using the generalized thrust and elevator command computation as seen in FIG. 3.

A summer circuit 292 produces an output signal which is the difference between the aircraft's actual angle of attack α (alpha) and the maximum allowable angle of attack reference signal $\alpha_{REF}$. The signal $\alpha_{REF}$ is computed as a function of flap position and MACH number in block 290. The resulting angle of attack error signal is normalized into a speed equivalent error $V_{\epsilon\alpha}$, using a gain factor $K_\alpha$ which is equal to the steady state value of the derivative $dV/d\alpha$. The short period α-response is attenuated by processing the normalized angle of attack error signal through a lag circuit 293, and the effect of the lag on the control dynamics is compensated by the addition of a short term airspeed error signal from the output of washout circuit 296 in summer 297. The input to washout circuit 296 is formed in summer 295 by combining a signal representative of true airspeed and a signal representative of the desired minimum speed increment $\Delta V$ which is developed as a function of the aircraft flap position in circuit 294. The result is a feedback signal $V_{MIN\epsilon}$ that is equivalent to airspeed error relative to the steady state speed that corresponds to $\alpha_{REF}$. The signal $V_{MIN\epsilon}$ is continually compared to the airspeed error from the CAS, MACH or SPEED PROFILE mode and $V_{MIN\epsilon}$ is selected via switch 298 whenever it is more positive than the regular speed control error signal. Thus, switchover between airspeed and angle of attack control is transient free and completely transparent. There is no difference in speed response dynamics, and the angle of attack control does not switch in generally unless a speed command is selected which would result in exceeding $\alpha_{REF}$. In that case, the speed commanded by the regular control mode is ignored and the $\alpha_{REF}$ becomes the controlling command, thereby maintaining the speed at a desired margin above the stall speed. Alternatively, the minimum safe speed $V_{MIN}$ may be developed from signals representative of the aircraft weight and flap position to form the $V_{MIN\epsilon}$ signal.

Analogous to the minimum speed control, the speed control is bounded on the upper side by the maximum operating speed $V_{MO}/M_{MO}$ control, which is switched in whenever the airspeed error $V_{MAX\epsilon}$ relative to $V_{MO}/M_{MO}$ and developed in circuit 300 is more negative that the airspeed error of the regular speed control mode.

Since the speed limiting control feeds into the generalized flight path and speed control circuitry, which includes the speed control priority provision using elevator only in case of thrust limiting, all flight modes are equally protected against stall and overspeed for all flight conditions.

Automatic switching to $V_{MIN}$ or $V_{MAX}$ control is indicated by flashing the inappropriate speed command or an alert light on the mode control panel or other primary information display.

Control Priority When Thrust Limited

Simultaneous closed loop control of the flight path and the speed requires both thrust and elevator control. Therefore, when the thrust limits, control of only one variable can be continued through the elevator. Equation (8) indicates that for a given constant speed ($\dot{V}=0$) and drag configuration (D) the achievable flight path angle $\gamma$ is entirely determined by the thrust. Therefore, the following control priority has been developed:

When the thrust limit is reached as a result of a flight path command, that flight path command cannot be satisfied while maintaining speed. In that case, it is desirable to continue active speed control through the elevator and give up active flight path control. This is accomplished by removing the $\gamma_\epsilon$ signal input to the elevator integral control signal path at summer 18 to prevent it from biasing the speed control.

To smooth the control reconfiguration, the $\gamma_\epsilon$ is not discretely switched out but, rather, "washed out" as a function of time, using amplifier 144 with a variable gain factor KGAE. Alternatively, a conventional "wash out" circuit may be used.

This control configuration remains in effect until the $\gamma_\epsilon$ reduces to a point where the throttles are driven out of the limit position. At that point, closed loop flight path and speed control is resumed.

Similarly, when the thrust limit is reached due to a speed command change, the $V_\epsilon$ signal input to the elevator integral control signal path must be removed to prevent it from biasing the flight path control. This may be done by way of amplifier 146, which has a variable gain factor KVDE. Alternatively, a "washout" circuit may be used.

Another embodiment, requiring less logic, uses a $\dot{V}_c$ limit in combination with the $\gamma_\epsilon$ variable gain amplifier 144. The specific total energy rate is represented by $$\dot{E}_s = \dot{V} + g\gamma. \tag{21}$$

Therefore, when thrust limits the maximum acceleration/deceleration that can be achieved by bringing $\gamma$ to zero is $\dot{V}_{MAX} = \dot{V} + g\gamma$. Thus, by limiting the signal $\dot{V}_c$ in limit circuit 140 to $\dot{V} + g\gamma$ and removing the $\gamma_\epsilon$ signal to the elevator control signal path while the throttles are in the limit position, the maximum level ($\gamma=0$) acceleration/deceleration is obtained. This latter method provides the much desired capability to accelerate during climb with the throttles at the forward limit, and to decelerate during descent with the throttles at idle without having to change control laws.

The $\dot{V}_c$ limit is further used to partition the total energy rate authority during conditions with limit thrust between flight path and speed control. This is achieved by setting $$\dot{V}_{cLIMIT} = \dot{V} - g\gamma_\epsilon$$

or $$\dot{V}_{cLIMIT} = K(\dot{V} + g\gamma), \tag{22}$$

whichever is greater than the thrust reaches the forward limit, and $$\dot{V}_{cLIMIT} = \dot{V} - g\gamma_\epsilon$$

or $$\dot{V}_{cLIMIT} = K(\dot{V} + g\gamma), \tag{23}$$

whichever is less when the thrust reaches the aft limit. In one embodiment the constant K was set to 0.5 when thrust reached the forward limit and to 1.0 when thrust reached the aft limit, resulting in a $\sim 50\%$ reduction of the maximum thrust climb gradient to satisfy a large acceleration command and a temporary leveling off during idle descent in order to satisfy a deceleration command.

While in the glide slope or vertical path mode, it is sometimes advantageous to prioritize flight path control to assure continued flight path tracking during conditions with limit thrust. For example, when a deceleration is commanded during glide slope capture, it is desirable not to interrupt the glide slope capture control. In such cases, flight path control is prioritized by temporary removal of the $\dot{V}_\epsilon$ signal to the elevator control signal path. This can safely be done as long as speed stays within the safety envelope of $\alpha_{REF}$ and $V_{MO}/M_{MO}$. Therefore, speed control priority is made absolute whenever the selected speed control mode is overridden by $V_{MIN}$ or $V_{MAX}$ control.

The control dynamics of either speed or flight path control using elevator only does not change when thrust limits and either the $\gamma_\epsilon$ or the $\dot{V}_\epsilon/g$ signal input to the elevator command computation is removed. This is so because, at constant thrust and drag, the incremental change in flight path $\gamma$ is equal and opposite to the incremental change in $\dot{V}/g$, as seen in equation (7), and the gains of the flight path angle and normalized acceleration feedbacks in the development of the elevator command are identical. Furthermore, the gains of the flight path angle and normalized acceleration feedbacks leading up to the pitch attitude command are identical to the corresponding gains leading up to the specific thrust command, since at constant speed $d(T/W)/d\gamma = d\theta/d\gamma = 1$, while at constant thrust also $d\gamma/d(\dot{V}/g) = 1$. Therefore, when thrust limits, a desired $\dot{V}/g$ is obtained by an instantaneous attitude change $\Delta\theta = \dot{V}/g$, in effect replacing the thrust force by an equivalent gravity force.

When thrust limits and active flight path control is abandoned, an indication is given to the pilot by flashing the flight path command readout or by an alert light on the mode control panel.

Elevator Innerloop Control

The elevator innerloop control, shown in the embodiment of FIG. 3, uses pitch rate and pitch attitude feedbacks. Alternatively, it is possible to use a normal acceleration/pitch rate feedback innerloop elevator control without deviating from the spirit of the present invention.

Normal and Longitudinal Acceleration Limiting

In conventional pitch autopilots it has been difficult to limit normal acceleration during vertical maneuvers on the one hand, while providing responsive, overshoot-free capture of the target flight path on the other hand. This problem has been solved in a simple, effective manner in the present Total Energy Control System design.

The path/speed control feedbacks and gains have been selected to yield critically damped responses to changes in the commanded flight path and/or speed for all conditions. Therefore, the normal acceleration, which is equal to $\dot{V}\gamma$, can simply be limited by rate limiting the commanded flight path angle to a value $$\dot{\gamma}_c = a_{NLIMIT}/V, \tag{24}$$

where $a_{NLIMIT}$ is the maximum allowed normal acceleration. This rate limit is applied directly to the flight path angle command signal $\gamma_c$, using rate limit circuitry 130 in FIG. 3.

In the altitude control modes $\gamma_c = K_h h_\epsilon/V = \dot{h}_c/V$ and thus, the vertical acceleration limit may be achieved by rate limiting the vertical speed command $\dot{h}_c$ to a value $$\ddot{h}_c = a_{NLIMIT}. \tag{25}$$

This approach is used for the altitude mode implementation shown in FIG. 5.

To maintain a match between the speed control and the path control, the $\dot{V}_c$ signal is also rate limited to a value $$a_{NLIMIT} g/V, \tag{26}$$

using rate limiter 134. This assures that, in case of simultaneous flight path and speed commands, the input signals to the thrust or to the elevator command computation cancel, thereby minimizing the unnecessary controller activity. The rate limit on the acceleration command signal $\dot{V}_c$ also helps to smooth the throttle and elevator response for large commands and reduce nuisance activity due to turbulence.

Use of the $\dot{V}_c$ rate limit necessitates the use of a corresponding $\dot{V}_c$ amplitude limit. In the linear region, the acceleration response called for is $$\dot{V} = \dot{V}_{ct=0} e^{-t/\tau} \tag{27}$$

and the rate of change of acceleration is then $$\ddot{V} = -(\dot{V}_{cT=0}/\tau) e^{-t/\tau}, \tag{28}$$

where $\tau = 1/K_v$ and $\dot{V}_{ct=0} = K_v V_{\epsilon t=0}$. Thus, in response to a speed command change, the system calls for a rate of change of acceleration which is maximum at $t=0$:

$$\ddot{V}_{MAX} = -\dot{V}_{ct=0}/\tau. \tag{29}$$

This rate of change of acceleration called for by the control law should be equal to or less than the set rate limit of $\dot{V}_c$. Therefore, $$\dot{V}_{ct=0}/\tau \leq (a_{NLIMIT} g)/V,$$

or $$\dot{V}_{ct=0} \leq (\tau a_{NLIMIT} g)/V, \tag{30}$$

which is achieved by limiting the amplitude of $\dot{V}_c$ to $(\tau a_{NLIMIT} g)/V$, or the amplitude of $\dot{V}_\epsilon$ to $$(\tau^2 a_{NLIMIT} g)/V = (a_{NLIMIT} g)/(V K_{v2}). \tag{31}$$

This $\dot{V}_c$ amplitude limit is provided by circuit 140. Failure to limit $\dot{V}_c$ would result in response overshoots after large changes in the commanded speed, since the initial amplitude of $\dot{V}_c$ would result in a higher rate of change of $\dot{V}_c$ than the actual rate limit can accomodate.

Likewise, a matching $h_c$ amplitude limiting circuit 142 has been implemented to assure that altitude response overshoots are avoided when responding to large altitude commands with a rate limited or $\gamma_c$.

Derivation of the Longitudinal Acceleration Signal

To obtain optimum dynamic system performance, the acceleration feedback signal is derived from engine thrust T, aircraft weight W, flight path angle $\gamma$, and true airspeed $V_{TRUE}$ $$(32) \quad \frac{\hat{\dot{V}}}{g} = (-\gamma + T/W) \frac{\tau_i S}{\tau_i S + 1} + \frac{V_{TAS}}{g} \frac{S}{\tau_i S + 1},$$

where S is the Laplace operator. The term $(-\gamma + T/W)$ represents the normalized acceleration along the flight path, neglecting the effect of drag variation. This term is washed out and complemented by a lagged airspeed rate term to reference the $\dot{V}$ to airspeed for the long term. The $\dot{V}$ signal feedback is superior to an inertially referenced longitudinal acceleration for airspeed control in turbulence and windshear.

Since the derived $\dot{V}$ does not contain short term drag information, the engines will not respond immediately in case of flap or landing gear position changes and the airplane will slow down or speed up naturally. Thus, the desired throttle response inhibiting function, to give pilots time to adjust speed commands in case of configuration changes, is realized without additional circuitry.

The signal T/W may be developed from signals representative of thrust and weight. The thrust signal may be developed from engine EPR and altitude pressure ratio $\delta$, in reverse manner of that used to calculate the commanded EPR, taking the number of operating engines into account. Alternatively, and preferably, $\Delta T/W$ may be derived using the signal $(\Delta T/W)_c$ from the output of summer 76 and the known engine dynamics. For example:

$$(33) \quad \Delta \hat{T/W} = (\Delta T/W)_c \frac{1}{\tau_E S + 1},$$

where $\tau_E$ is the effective engine time constant. This approach eliminates the potential complexity of needing multiple engine EPR-feedback signals and avoids the need for specific engine information in the flight control computer when electronic engine controls are employed accepting net thrust commands.

Referring to FIG. 3, the derived longitudinal acceleration feedback is implemented using amplifier 150, divider 152, summer 154 and filter 156.

Turbulence and Windshear Performance

It can be shown that throttle and elevator activity induced by atmospheric turbulence is ineffective for improving speed and path tracking. It appears, therefore, attractive to design the system with low controller responses in turbulence. However, such a system will perform poorly in windshear. It was found that the "penalty", in terms of throttle and elevator activity in turbulence to achieve a desired level of speed and path tracking in windshear, is largely the same regardless of the type of system design. The controller activity depends mostly on the magnitude of the feedback gains and the amount of filtering of the feedback signals affected by turbulence.

The present Total Energy Control System is especially capable of controlling the effect of windshear since both speed and path deviation are fed back to form the energy error-based thrust command signal. Likewise, speed and path deviations are fed back to form the energy distribution error-based elevator command signal. This design also eliminates pitch/throttle coupling, excited by horizontal and vertical turbulence, a long standing problem with previous state-of-the-art systems.

Increasingly tight airspeed and flight path control is required as the airplane descends for landing. This is achieved mainly by simple adjustment of the system parameters $K_v$, $K_h$ and $\tau_v$ of amplifiers 64, 42 and filter 156. During cruise, where windshear is not a safety concern, $K_v$ and $K_h$ are decreased and $\tau_v$ increased to reduce controller activity induced by turbulence and minimize normal and longitudinal accelerations. System stability and command tracking in turbulence are virtually unaffected by changes in $K_v$, $K_h$ and $\tau_v$. Further reduction of controller activity can be achieved by reducing the proportional and integral gains KEP, KTP, KEI, KTI. In that case, the system approaches a thrust and pitch attitude hold system. Then, when speed/altitude adjustments are required, or when the energy error exceeds a set limit (e.g. due to windshear), the system temporarily reverts to full "capture" gains.

It should also be noted that the energy based normalization reduces the system's sensitivity to altitude errors as speed increases, while energy errors tend to be equally distributed between speed and altitude.

Flare Control

A flare control mode is provided by circuitry indicated generally at 310. This control circuitry combines principles of total energy control with the "Variable Tau" system described in co-pending patent application Ser. No. 162,451 invented by Antonius A. Lambregts and Rolf Hansen, filed June 24, 1980 and assigned to the same assignee as the present application. The "Variable Tau" flare law commands the airplane to fly a geometrically fixed flare trajectory relative to the runway. This control law is characterized by the sinkrate to altitude feedback gain ratio $K_{\dot{h}}/K_h = \text{constant} \times V_{GROUND}$. Since the present energy control system uses a proportional $\hat{\gamma}$ feedback, the "Variable Tau" flare law is simply implemented by the feedback of altitude, or more suitably, the integral of sinkrate, with a gain proportional to $V_{GROUND}/\hat{V}$. A sinkrate bias is added to obtain the desired sinkrate at touchdown.

The sinkrate feedback is switched over at flare initiation, via switch 312, from the inertially smoothed barometric complemented altitude signal $\hat{h}$ to a radio altitude derived $\hat{h}_{FLARE}$. This is accomplished by complementary high pass/low pass $\hat{h}$ filters 314 and 316. The $\hat{h}$ signal input to lag circuit 314 is switched out at the time the radio altitude input signal to the high pass filter 316 drops below its limit. The response transients of the decaying lagged $\hat{h}$ signal and the buildup of the radio altitude rate signal developed at the output of the high pass filter 316 complement each other resulting in a smooth switchover to $h_R$ derived $\hat{h}_{FLARE}$.

The radio altitude signal limit is set at a desired flare initiation height $h_{FL}$, low enough to assure that the aircraft is over level terrain at the start of flare and high enough to allow a smooth flare maneuver. The flare control is, therefore, insensitive to uneven approach terrain.

A second part of the flare control is obtained by switching from speed error feedback to a deceleration command, using switch 250. This deceleration command is selected to help rotate the aircraft and bring the throttles smoothly aft for a nominal undisturbed flare. The retard rate is modulated, however, based upon the energy error relative to a nominal flare.

Implementation of Pilot Selectable Control Modes

The energy based flight control system provides a full complement of pilot selectable longitudinal autopilot-/autothrottle and flight management system control modes including:
Flight Path Angle Hold/Select
Velocity Control Wheel Steering
Altitude Hold/Select
Glide Slope Capture/Track
Go-Around
Vertical Path
Airspeed Hold/Select
MACH Hold/Select, and Speed Profile.

The Total Energy Control System allows a simpler, more effective mode control panel, illustrated in FIG. 4, for the selection of these modes. The control functions are grouped into longitudinal flight path, speed and lateral flight path control modes. The system can be engaged by pressing any longitudinal flight path or speed mode engage button. The default speed or flight path mode (calibrated airspeed or flight path angle) will also engage. Only one path and one speed mode can be engaged simultaneously. The glide slope and vertical path modes have both an ARM and ENGAGE status. When these mode buttons are pressed and certain pre-engage requirements are met, these modes will arm, indicated by an amber arm light. Automatic engage follows and the light turns green when certain engage conditions are met.

All modes are controlled by single control knobs and arm/engage switches which are operational over the entire flight regime. No pilot action is ever required to resolve mode control conflicts or prevent unsafe conditions.

FIG. 5 is a detailed block diagram showing the preferred implementation of the various pilot selectable control modes.

The flight path angle mode (FPA) is the basic path mode. The FPA mode circuitry is indicated generally at 200. This has been implemented rather than the vertical speed, because it allows precise range/altitude intercept capability when used in combination with the horizontal/vertical situation displays for profile descent operations. A special case of the range/altitude intercept is the final approach to the runway. With the proper navigation/display computations, it becomes a simple matter to target the flight path angle to the approach end of the runway. For this reason, inertial (rather than airmass referenced) flight path angle $\gamma_I$ is used for the FPA mode. It is obtained by dividing the inertially smoothed vertical speed $\hat{h}$, derived in the complementary filter shown in FIG. 6, by the ground speed, in divider circuitry 202. The flight path angle command $\gamma_c$ is formed by adding the flight path angle that existed at the time of mode engagement, and memorized in the track and hold circuitry 204, to the desired incremental flight path command $\Delta\gamma_c$. The $\Delta\gamma_c$ signal is developed by counting the pulses of an optical encoder (not shown) which is stimulated by rotation of the FPA select knob (FIG. 4) on the mode control panel.

A Velocity Vector Control Wheel Steering (VCWS) mode has been implemented using the Total Energy Control concept to provide very precise manual maneuvering capability and superior aircraft handling and response characteristics. Direct control over the aircraft's velocity vector facilitates execution of flight paths which are inertially, i.e. earth referenced, such as glide slope capture and tracking. Such a control capability also reduces pilot workload sharply, since the aircraft will track the inertial flight path established by the pilot, in spite of the disturbances.

Such a control mode was earlier developed as a separate capability and is described in previously identified patent application Ser. No. 162,451.

The present Total Energy Control system provides an even more ideal baseline control law for implementation of the VCWS mode, since it inherently provides decoupled control over the amplitude (V) of the aircraft's velocity vector and its direction ($\gamma$).

Only the $\dot{\gamma}_c$ processing and the response augmentation design need to be added to the baseline control concept of FIG. 3. This is shown in FIG. 5, with the circuitry indicated at 180.

In the VCWS mode the $\dot{\gamma}_c$ signal is developed by scaling the column force signal $F_{COL}$, after processing the signal in dead zone circuit 182, by a factor inversely proportional to inertially smoothed speed $\hat{V}$ in divider 184 and a factor KGDC in amplifier 186 to form the commanded rate of change of flight path angle signal $\dot{\gamma}_c$. The gain $\dot{\gamma}_c/F_{COL}$ is scaled inversely proportional to $\hat{V}$ to provide approximately constant stick force per unit normal acceleration, regardless of the speed. The $\dot{\gamma}_c$ signal output from amplifier 186 is filtered by a small lag in circuit 188, and integrated in circuit 190 to form the $\gamma_c$ signal. The small lag provides a more natural response for $\gamma_c$ which is used for pilot display to close the short term pilot control loop.

The dead zone circuit 182 guards against inadvertent drift of the $\gamma_c$ signal when the pilot does not intend a maneuver.

The natural response of the baseline control system to a $\gamma_c$ signal is too sluggish for manual control. Therefore, response augmentation is provided by feeding the $\dot{\gamma}_c$ signal to the input of the thrust command integrator 72 of FIG. 3 via summer 20 using the gain amplifier 292. The signal $\dot{\gamma}_c$ is also fed to summers 18 and 86 of FIG. 3 via gain amplifiers 294 and 296 for the development of coordinated pitch attitude command. The gains of amplifiers 292, 294 and 296 have been selected to provide the desired $\gamma$ response quickening without affecting the decoupling from speed control. To accommodate the condition where the steady state flight path angle limit is reached due to thrust limiting, the $\dot{\gamma}_c$ input to circuit 188 is removed using switch 298 at the same time the $\gamma_\epsilon$ signal is removed from summer 18. At that point a column force will not increase $\gamma_c$ further and the column will stiffen due to the automatic control system action to prevent exceeding of the limit flight path angle. As a result, very smooth and responsive manual control over $\gamma$ has been provided with the additional safety feature of indication of the steady state performance limit through the stiffening of the column force. The risk of stalling or overspeeding the aircraft during manual VCWS control is thereby largely eliminated.

The altitude mode can be directly engaged by pushing the HOLD button. It can also be armed to engage and capture a pre-selected altitude, simply by dialing the altitude knob to the desired altitude when another path mode is engaged and pressing the CAPT button. The mode then automatically engages to capture when the selected altitude is intercepted. While engaged, the altitude command can be changed to any desired value and the altitude mode will execute the change unless the HOLD button has been pushed first. No mode switching is required. For substantial altitude changes, maximum thrust will be used. Speed control remains in effect at all times, and vertical maneuvers will not cause significant speed deviation since elevator and throttle commands are precisely coordinated to prevent this.

As discussed above, the $\gamma_\epsilon$ signal is developed by normalization of the altitude error:

$$\gamma_\epsilon = \gamma_c - \gamma = (K_h h_\epsilon - \hat{\dot{h}})/\hat{V}. \tag{34}$$

The normalization of the altitude error uses a complementary filtered airspeed/groundspeed signal $\hat{V}$ which is representative of airspeed for low frequencies. The filter is shown in FIG. 7. Low frequency airspeed is used to preserve the energy relationship between altitude and airspeed and the filtering is needed to avoid undesired controller activity due to turbulence.

If $h_\epsilon$ is very large, the sign of $\dot{h}_{\epsilon ALT}$ will be the same as the sign of $h_\epsilon$ indicating that the commanded flight path angle for intercepting the target altitude is steeper than the actual flight path angle as established by the mode in control. Mode switch-over to ALT is inhibited as long as this condition exists. As $h_\epsilon$ reduces, $\dot{h}_{\epsilon ALT}$ will eventually change sign, indicating that from that point on the ALT control law commands the aircraft to align itself with the target (horizontal) path.

Thus, the ALT mode is engaged as soon as the sign of $\dot{h}_{\epsilon ALT}$ becomes opposite to the sign of $\dot{h}_{cALT}$. Since only the signal of the integrator signal path is switched, mode switching is always transient free and fully adaptive to any flight condition. The integrators never need re-initialization. The commanded flight path is always captured without overshoot. The capture time constant is set by the gain Kh in amplifier 214.

This simple mode transitioning concept eliminates the capture sub-mode and the command synchronization hardware or software that is used in conventional control laws to achieve smooth mode transitioning.

The $(\dot{h}_c)_{ALT}$ signal is limited, by amplitude limiter 216 and rate limiter 218, to assure that, for large changes in the commanded altitude, the vertical speed and vertical acceleration stay within desirable limits and also to prevent altitude capture overshoots. However, for most flight conditions, the achievable $\dot{h}$ is restricted by the available thrust/drag.

The glide slope control mode is implemented using the circuitry indicated generally at 220. This system is analogous to the altitude control mode. The only differences are:

(1) a linear path deviation is developed from the glide slope using radio altitude $h_R$, and (2) a sinkrate signal $\Delta \dot{h}_{GS}$ relative to the glide slope is used instead of the absolute sinkrate $\dot{h}$. This is done by complementary filtering of the vertical speed and the linearized glide slope deviation signal to provide the proper relationship between $(\Delta \dot{h}_c)_{GS}$ and $\Delta \dot{h}_{GS}$, needed for proper mode engagement.

This mode also has a "pre-engage" or "arm" status where $(\dot{h}_\epsilon)_{GS}$ is computed but control engagement is inhibited until the sign of $(\dot{h}_\epsilon)_{GS}$ becomes opposite to the sign of $(\Delta \dot{h}_c)_{GS}$, indicating the point where the glide slope capture trajectory is tangential to the existing flight path. Thus, glide slope captures are always fully adapted for the specific approach speeds and initial flight path, and capture overshoots are avoided.

The proportional flight path angle feedback for glide slope control has an important advantage over a conventional $\dot{h}$ feedback system. While tracking the glide slope, the steady state $\gamma$ feedback signal is balanced out by the elevator and thrust command integrators and is unaffected by the approach speed. A deceleration on the glide slope causes, therefore, no control transient, and glide slope departures as occur in systems using an $\dot{h}$ feedback signal are, thus, eliminated at no additional hardware or software expense.

The use of integral control of the normalized flight path angle error signal $$(\dot{h}_\epsilon)_{GS} = K_h \Delta h_{GS} - (\Delta h_{GS} s + \tau S \dot{h})/(\tau S + 1) \quad (35)$$

provides inherent inertial smoothing of the beam deviation signal $\Delta h_{GS}$, with a roll-off frequency $1/\tau$. No separate filtering is used and, thus, the associated filter switching and initialization problems and complexities are avoided.

Go-around mode control circuitry is indicated generally at 260. The go-around mode is achieved by simply switching, via switch 262 and switch 202, to a fixed flight path angle command $(\gamma_c)_{GA}$. This $(\gamma_c)_{GA}$ signal is selected to require full power for a nominal airplane weight and thrust condition. Upon go-around engagement, the aircraft will simply be rotated to establish $\hat{\gamma} = (\gamma_c)_{GA}$ causing the throttles to drive to the forward limit at approximately maximum rate. Speed control is maintained at all times. Thus, the pilot can then manage speed and flap commands as desired. Flaps may be retracted before changing the commanded speed since the $\alpha$-limit control maintains a stall margin, regardless of the selected speed and flap position.

The $(\gamma_c)GA$ signal has a shaping filter 264 to allow shaping of the initial versus final response. Selection of a fixed $(\gamma_c)_{GA}$ prevents excessive climb rates and pitch attitudes in case of a high thrust-to-weight ratio condition. In that case the system uses less than full power. The system is also safe for very low thrust-to-weight conditions (e.g. for failed engine) because the throttle simply drives to the forward limit and speed control is maintained through the elevator, even if the $(\gamma_c)_{GA}$ cannot be satisfied entirely. The previously described speed control priority logic assures this operation.

The commanded airspeed hold/select mode (CAS), which is the basic speed mode, is implemented using the circuitry shown generally at 230. As discussed above, a speed mode is always engaged simultaneously with the path mode. The CAS command is formed, as with the path mode commands, by memorization of the existing speed at mode engage, in track and hold circuit 232, with the addition of an incremental command signal $CAS_c$ resulting from rotation of a speed knob. The CAS error, which is the difference between $CAS_c$ and the actual CAS is converted into a true airspeed error, via divider 234, using an altitude dependent conversion factor. This is done to keep the gain relationship between true airspeed and the acceleration damping constant over the entire flight path envelope and thereby maintain constant speed control dynamics. The resulting airspeed error $V_{\epsilon SEL}$ is normalized into an acceleration command $\dot{V}_c$ by multiplication with the factor $K_v$, via amplifier 236. The acceleration command $\dot{v}_c$, together with acceleration feedback $\hat{v}$, are used to form the acceleration error signal $\hat{v}_\epsilon$ for use in developing both the thrust and elevator commands.

The MACH command signal is developed by circuitry indicated generally at 250 in a manner similar to the CAS command. The MACH command is converted to a true airspeed command $v_{Tc}$ by multiplication with the speed of sound. The speed of sound signal (a) is developed by dividing true airspeed by MACH in a divider circuit 252. The true airspeed error is formed by subtracting true airspeed $v_{TRUE}$ from the true airspeed command $v_{Tc}$. The resulting airspeed error is routed via switch 270 and switch 280 to amplifier 236 to produce the $\dot{v}_c$ signal.

Since the speed control is always executed in terms of true airspeed, the MACH or CAS modes can be used interchangeably.

An automatic CAS to MACH switchover is built into the system which occurs when reaching a predetermined MACH number during climb and a MACH to CAS switchover on descent when CAS reaches a predetermined value. The switchover points can be set as desired to suit a particular climb and descent procedure.

A $\Delta \dot{V}_c$ signal is developed from the $V_{\epsilon SEL}$ and the $v_{TRUE}$ signals using a washout circuit 282 and rate limit circuit 284. This $\Delta \dot{V}_c$ signal is used to command the acceleration that is required during constant MACH-/CAS climb or descent. Without it, some airspeed error would develop to null the $\dot{v}_\epsilon$ signal.

The rate limit circuit 284 is used in the $\Delta \dot{V}_c$ signal development to filter out undesired signals due to step changes in the $CAS_c$ or $MACH_c$.

The present energy based flight control system provides coordinated control of speed and flight path. It is, therefore, ideally suited for controlling vertical paths and speeds that are pre-programmed in a flight management computer. The advantages of using the present system for vertical path and speed profile control are:

the control switching to successive legs of the vertical path is handled in a simple and effective manner;

it eliminates the need to develop separate flight management control laws;

the required interfaces with the flight management computer are simple;

complex mode logic for control law switchover and initialization is avoided; and performance for vertical path and speed profile modes is identical to other autopilot modes.

The vertical path control mode circuitry is indicated generally at 290. Concurrent inputs $h_{cN}$ and $h_{cN+1}$ of the commanded altitude for the present and for the next straight line segment of the vertical path profile are used.

The vertical path profile may be developed in a flight management computer based on considerations for air traffic control or optimal aircraft operating economy. The vertical path control command development is entirely analogous to the glide slope control command development, except the dual computations for the present and the next leg are used. Computations for the next leg are carried out simultaneously with the computations for the present leg to determine the exact time for starting the capture of the next leg, just as is done for glide slope control.

As soon as control reverts to the second computation branch, the first computation branch is supplied with the altitude command information for the next leg. For this purpose the legs must be extended backwards to find the $h_c$ for the present position of the aircraft. Control thus reverts from one computation leg to the other and back, as the successive legs of the profile are flown.

In the speed profile mode, which may be used to provide time referenced control (4D), a commanded groundspeed $V_{Gc}$, along with the actual aircraft groundspeed $V_G$, is routed via switch 280 as inputs to the standard control circuitry. The present energy based flight control system can execute a speed command versus time profile without causing deviations from the vertical path profile.

Thus, for any combination of flight path and speed modes, the generalized $\gamma_\epsilon$ and $\dot{V}_c$ signals are developed as shown in FIG. 5, for coupling to the standard thrust and elevator command processing shown in FIG. 3. For a complete system implementation, the $\gamma_\epsilon$ signal output of FIG. 5 replaces the $\gamma_\epsilon$ signal output from summer 12 of FIG. 3 and the $\dot{V}_c$ signal of FIG. 5 replaces the input to the $\dot{V}_c$ limiter 140 of FIG. 3.

In summary, an energy based flight control system has been described in detail.

Whereas a preferred embodiment of the invention has been discussed, it should be apparent that many modifications and variations thereto are possible, all of which fall within the true spirit and scope of the invention.

I claim:

1. An aircraft longitudinal flight control system for automatically controlling the aircraft's flight path and speed, using engine thrust and elevator control surface position, comprising:

means for developing an incremental net thrust command signal $\Delta T_c$ which is a linear combination of a signal representative of the aircraft's total energy error with respect to the flight path and speed command targets and a signal representative of the rate of change of the aircraft's total energy;

thrust control means for automatically controlling the incremental net thrust of the engines to said incremental net thrust command signal $\Delta T_c$, such that said total energy error is reduced to zero;

means for developing an incremental elevator position command $\Delta \delta_{ec}$ for controlling the deviation of the aircraft from a commanded flight path; and elevator position control means for automatically positioning the elevator to said incremental elevator command signal $\Delta \delta_{ec}$ such that said deviation of the aircraft from the commanded flight path is reduced to zero.

2. An aircraft longitudinal flight control system for automatically controlling the aircraft's flight path and speed using engine thrust and elevator control surface position, comprising:

means for developing an incremental thrust command signal $\Delta T_c$ which is a linear combination of a signal representative of the aircraft's total energy error with respect to the flight path and speed command targets and a signal representative of the rate of change of the aircraft's total energy;

thrust control means for automatically controlling the incremental thrust to said incremental thrust command signal $\Delta T_c$ such that said total energy error is reduced to zero;

means for developing an incremental elevator command signal $\Delta \delta_{ec}$ which is a linear combination of a signal representative of the aircraft's total energy distribution error with respect to the flight path and speed targets, a signal representative of the rate of change of the total energy distribution, and pitch control damping signals; and elevator position control means for automatically controlling the incremental elevator position to said incremental elevator command signal $\Delta \delta_{ec}$ such that said aircraft's total energy distribution error is reduced to zero.

3. An automatic flight control system for controlling an aircraft's vertical flight path and speed, comprising:

means for developing a flight path angle command signal $\gamma_c$ for guiding the aircraft to, or holding the aircraft on, a desired vertical flight path;

means for developing a longitudinal acceleration command signal $\dot{V}_c$ for guiding the aircraft to, or holding the aircraft on, a desired speed;

means for providing signals representative of the aircraft's vertical flight path angle $\gamma$ and longitudinal acceleration $\dot{V}$;

means for simultaneously processing said $\gamma_c$, $\gamma$ and said $\dot{V}_c$, $\dot{V}$ signals to produce an incremental net thrust command signal $\Delta T_c$ and an incremental elevator command signal $\Delta \delta_{ec}$, said $\Delta T_c$ and $\Delta \delta_{ec}$ signals being related to the aircraft's total energy error and total energy distribution error, respectively, with respect to the flight path and speed command targets, and said $\Delta T_c$ and $\Delta \delta_{ec}$ signals coordinated in time and in magnitude to provide decoupled vertical flight path and speed command control;

means for receiving the incremental thrust command signal $\Delta T_c$ and controlling the net thrust of the engines in response thereto; and means for receiving the incremental elevator command signal $\Delta \delta_{ec}$ and controlling the elevator position in response thereto.

4. An automatic flight control system for controlling the aircraft's vertical flight path and speed, comprising:

means for developing a flight path angle command signal $\gamma_c$ for guiding the aircraft to, or holding the aircraft on, a desired flight path;

means for developing a longitudinal acceleration command signal $\dot{V}_c$ for guiding the aircraft to, or holding the aircraft on, a desired speed;

means for providing signals representative of the aircraft's vertical flight path angle $\gamma$ and longitudinal acceleration $\dot{V}$;

means for developing a signal $\dot{E}_{s\epsilon}$ representative of the specific total energy rate error, where $\dot{E}_{s\epsilon} = (\gamma_c - \gamma) + (\dot{V}_c - \dot{V})/g$ and a signal $\dot{D}_\epsilon$ representative of the energy rate distribution error where $\dot{D}_\epsilon = -(\gamma_c - \gamma) + (\dot{V}_c - \dot{V})/g$;

automatic thrust control means for controlling the net thrust in linear proportion to the time integral of said $\dot{E}_{s\epsilon}$ signal;

automatic elevator position control means controlling the elevator position in linear proportion to the time integral of said $\dot{D}_\epsilon$ signal;

said simultaneous thrust and elevator control causing the flight path and speed to track the commanded flight path and speed.

5. An automatic flight control system for controlling an aircraft's vertical flight path and speed, comprising:

means for developing a flight path angle command signal $\gamma_c$ and a longitudinal acceleration command signal $\dot{V}_c$ for guiding the aircraft to, or holding the aircraft on, a desired flight path and speed;

means for providing signals representative of the aircraft's flight path angle $\gamma$ and longitudinal acceleration $\dot{V}$;

means for developing an incremental thrust command signal $\Delta T_c$ by forming a linear combination of the time integral of the aircraft's specific total energy rate error signal $\dot{E}_{s\epsilon}$, where $\dot{E}_{s\epsilon} = (\gamma_c - \gamma) + (\dot{V}_c - \dot{V})/g$ and the specific total energy rate signal $\dot{E}_s$, where $\dot{E}_s = \gamma + \dot{V}/g$:

$$\Delta T_c = \frac{K_{TI} \dot{E}_{s\epsilon}}{S} - K_{TP} \dot{E}_s;$$

and means for developing an incremental elevator position command signal $\Delta \delta_{ec}$, by forming a linear combination of the time integral of the aircraft's energy rate distribution error signal $\dot{D}_\epsilon$, where $\dot{D}_\epsilon = -(\gamma_c - \gamma) + (\dot{V}_c - \dot{V})/g$ and the energy rate distribution signal $\dot{D}$, where $\dot{D} = -\gamma + \dot{V}/g$:

$$\Delta \delta_{ec} = K_{EI} \frac{\dot{D}_\epsilon}{S} - K_{EP} \dot{D};$$

thrust control means for coupling said incremental thrust command signal $\Delta T_c$ to the engine and controlling the thrust thereto; and elevator position control means for coupling said incremental elevator command signal $\Delta \delta_{ec}$ to the elevator and controlling the position thereto.

6. The system of any one of the claims 3 or 5 wherein said incremental thrust command signal $\Delta T_c$ is scaled in proportion to aircraft weight.

7. The system of claim 6 in which said means for developing the incremental elevator command signal includes:

means for providing and processing aircraft pitch control damping signals such as pitch rate $\dot{\theta}$ and pitch attitude $\theta$ or vertical acceleration $\ddot{h}$ to produce a pitch damping signal; and means for combining said pitch damping signal with said incremental elevator command signal producing a total elevator command signal, yielding energy distribution control with pitch damping when coupled to said elevator control system.

8. The system of claim 7 wherein said means for developing the flight path angle command signal $\gamma_c$ comprises:

means responsive to pilot manipulation for selecting the desired flight path angle command and providing a representative signal output thereof.

9. The system of claim 8 wherein said means for developing the flight path angle command signal $\gamma_c$, comprises:

means for providing a signal representative of the force exerted by the pilot on the aircraft control column;

means for processing said column force signal through a dead zone circuit;

means for scaling the output from said dead zone circuit inversely proportional to a signal representative of airspeed or inertially smoothed airspeed to provide a signal $\dot{\gamma}_c$ representative of the rate of change of the flight path angle command; and means for lag filtering and integrating said $\dot{\gamma}_c$ signal to provide said flight path angle command signal $\gamma_c$ for the velocity vector control wheel steering mode.

10. The system of claim 7 wherein said means for developing the flight path angle command signal $\gamma_c$; comprises:

means for providing a signal representative of the force exerted by the pilot on the aircraft control column;

means for processing said column force signal through a dead zone circuit;

means for scaling the output from said dead zone circuit inversely proportional to a signal representative of airspeed or inertially smoothed airspeed to provide a signal $\dot{\gamma}_c$ representative of the rate of change of the flight path angle command; and means for lag filtering and integrating said $\dot{\gamma}_c$ signal to provide said flight path angle command signal $\gamma_c$ for the velocity vector control wheel steering mode.

11. The system of claim 6 wherein said means for developing the flight path angle command signal $\gamma_c$ comprises:

means responsive to pilot manipulation for selecting the desired flight path angle command and providing a representative signal output thereof.

12. The system of claim 11 wherein said means for developing the flight path angle command signal $\gamma_c$, comprises:

means for providing a signal representative of the force exerted by the pilot on the aircraft control column;

means for processing said column force signal through a dead zone circuit;

means for scaling the output from said dead zone circuit inversely proportional to a signal representative of airspeed or inertially smoothed airspeed to provide a signal $\dot{\gamma}_c$ representative of the rate of change of the flight path angle command; and means for lag filtering and integrating said $\dot{\gamma}_c$ signal to provide said flight path angle command signal $\gamma_c$ for the velocity vector control wheel steering mode.

13. The system of claim 6 wherein said means for developing the flight path angle command signal $\gamma_c$ comprises:

means for providing a signal representative of the force exerted by the pilot on the aircraft control column;

means for processing said column force signal through a dead zone circuit;

means for scaling the output from said dead zone circuit inversely proportional to a signal representative of airspeed or inertially smoothed airspeed to provide a signal $\dot{\gamma}_c$ representative of the rate of change of the flight path angle command; and means for lag filtering and integrating said $\dot{\gamma}_c$ signal to provide said flight path angle command signal $\gamma_c$ for the velocity vector control wheel steering mode.

14. The system of claim 6 wherein said means for developing the flight path angle command signal $\gamma_c$ comprises a bias signal selected to provide an optimum climb-out gradient during go-around, said bias signal processed through shaping filter to provide the desired initial dynamics.

15. The system of claim 6 wherein said means for developing the flight path angle command signal $\gamma_c$ comprises:

means for developing a vertical speed command signal $\dot{h}_c$;

means for providing a signal V representative of the aircraft speed; and means for normalization of said $\dot{h}_c$ signal into said $\gamma_c$ signal according to the relationship $\gamma_c = \dot{h}_c/V$.

16. The system of either one of claims 3 or 5 in which said means for developing the incremental elevator command signal includes:

means for providing and processing aircraft pitch control damping signals such as pitch rate $\dot{\theta}$ and pitch attitude $\theta$ or vertical acceleration $\ddot{h}$ to produce a pitch damping signal; and means for combining said pitch damping signal with said incremental elevator command signal producing a total elevator command signal, yielding energy distribution control with pitch damping when coupled to said elevator position control means.

17. The system of claim 16 wherein said means for developing the flight path angle command signal $\gamma_c$ comprises:

means responsive to pilot manipulation for selecting the desired flight path angle command and providing a representative signal output thereof.

18. The system of claim 17 wherein said means for developing the flight path angle command signal $\gamma_c$, comprises:

means for providing a signal representative of the force exerted by the pilot on the aircraft control column;

means for processing said column force signal through a dead zone circuit;

means for scaling the output from said dead zone circuit inversely proportional to a signal representative of airspeed or inertially smoothed airspeed to provide a signal $\dot{\gamma}_c$ representative of the rate of change of the flight path angle command; and means for lag filtering and integrating said $\dot{\gamma}_c$ signal to provide said flight path angle command signal $\gamma_c$ for the velocity vector control wheel steering mode.

19. The system of claim 16 wherein said means for developing the flight path angle command signal $\gamma_c$, comprises:

means for providing a signal representative of the force exerted by the pilot on the aircraft control column;

means for processing said column force signal through a dead zone circuit;

means for scaling the output from said dead zone circuit inversely proportional to a signal representative of airspeed or inertially smoothed airspeed to provide a signal $\dot{\gamma}_c$ representative of the rate of change of the flight path angle command; and means for lag filtering and integrating said $\dot{\gamma}_c$ signal to provide said flight path angle command signal $\gamma_c$ for the velocity vector control wheel steering mode.

20. The system of claim 16 wherein said means for developing the fight path angle commanded signal $\gamma_c$ comprises a bias signal selected to provide an optimum climb-out gradient during go-around, said bias signal processed through shaping filter to provide the desired initial dynamics.

21. The system of claim 16 wherein said means for developing the flight path angle command signal $\gamma_c$ comprises:

means for developing a vertical speed command signal $\dot{h}_c$;

means for providing a signal V representative of the aircraft speed; and means for normalization of said $\dot{h}_c$ signal into said $\gamma_c$ signal according to the relationship $\gamma_c = \dot{h}_c/V$.

22. The system of any one of claims 3 through 5 wherein said means for developing the flight path angle command signal $\gamma_c$ comprises:

means responsive to pilot manipulation for selecting the desired flight path angle command and providing a representative signal output thereof.

23. The system of claim 22 wherein said means for developing the flight path angle command signal $\gamma_c$, comprises:

means for providing a signal representative of the force exerted by the pilot on the aircraft control column;

means for processing said column force signal through a dead zone circuit;

means for scaling the output from said dead zone circuit inversely proportional to a signal representative of airspeed or inertially smoothed airspeed to provide a signal $\dot{\gamma}_c$ representative of the rate of change of the flight path angle command; and means for lag filtering and integrating said $\dot{\gamma}_c$ signal to provide said flight path angle command signal $\gamma_c$ for the velocity vector control wheel steering mode.

24. The system of any one of claims 3 through 5 wherein said means for developing the flight path angle command signal $\gamma_c$ comprises:

means for providing a signal representative of the force exerted by the pilot on the aircraft control column;

means for processing said column force signal through a dead zone circuit;

means for scaling the output from said dead zone circuit inversely proportional to a signal representative of airspeed or inertially smoothed airspeed to provide a signal $\dot{\gamma}_c$ representative of the rate of change of the flight path angle command; and means for lag filtering and integrating said $\dot{\gamma}_c$ signal to provide said flight path angle command signal $\dot{\gamma}_c$ for the velocity vector control wheel steering mode.

25. The system of claim 24 wherein said $\dot{\gamma}_c$ signal processing further includes:

first $\dot{\gamma}_c$ amplifying means for providing a rate of change of thrust command signal which is input to the thrust command integrator;

second $\dot{\gamma}_c$ amplifying means for developing a rate of change of elevator command signal which is input to the elevator command integrator; and third $\dot{\gamma}_c$ amplifying means for developing a pitch rate command signal which is added to the elevator command signal downstream of the elevator command integrator.

26. The system of any one of claims 3 through 5 wherein said means for developing the flight path angle command signal $\gamma_c$ comprises a bias signal selected to provide an optimum climb-out gradient during go-around, said bias signal processed through shaping filter to provide the desired initial dynamics.

27. The system of any one of claims 3 through 5 wherein said means for developing the flight path angle command signal $\gamma_c$ comprises:

means for developing a vertical speed command signal $\dot{h}_c$;

means for providing a signal V representative of the aircraft speed; and means for normalization of said $\dot{h}_c$ signal into said $\gamma_c$ signal according to the relationship $\gamma_c = \dot{h}_c/V$.

28. The system of claim 27 wherein said aircraft speed signal V represents airspeed or inertially smoothed airspeed.

29. The system of claim 27 in which the means providing said $\dot{h}_c$ signal comprises:

means responsive to pilot manipulation for selecting the desired vertical speed and providing a representative signal output thereof.

30. The system of claim 27 in which the means for providing said $\dot{h}_c$ signal comprises:

means for providing the altitude deviation signal $h_\epsilon$ of the aircraft relative to a desired flight path; and means for normalizing said altitude deviation signal $h_\epsilon$ into said $\dot{h}_c$ signal according to the relationship $$\dot{h}_c = K_h h_\epsilon$$

wherein $K_h$ is a constant, selected to provide suitable h response dynamics.

31. The system of claim 30 in which engagement of the altitude control mode is triggered by the flight path angle error signal $\gamma_\epsilon$ (where $\gamma_\epsilon = K_h h_\epsilon/V - \gamma$) becoming opposite in sign to the commanded flight path angle signal $\gamma_c$ (where $\gamma_c = K_h h_\epsilon/V$), indicating a condition in which the aircraft is tangent to the altitude command capture trajectory as represented by the locus of $K_h h_\epsilon/V - \gamma = 0$.

32. The system of claim 30 in which the flight path angle error for flying the landing approach glide path is formed according to the relationship:

$$\gamma = K_h h_\epsilon/V - \left( \frac{(-h_\epsilon + \tau \dot{h}) S}{\tau S + 1} \right) /V$$

or $$\gamma = K_h h_\epsilon/V_\epsilon - \left( \frac{-h_\epsilon S}{\tau S + 1} + \frac{\tau \ddot{h}}{\tau S + 1} \right) /V.$$

where $h_\epsilon$ = the linear deviation of the aircraft from the desired glide path $k_h$ = constant providing suitable path capture dynamics V = airspeed or inertially smoothed airspeed, $\dot{h}$ = aircraft vertical speed, $\ddot{h}$ = aircraft vertical acceleration, $\tau$ = filter time constant, and S = Laplace operator.

33. The system of claim 30 in which the flight path angle error for flying a vertical path profile consisting of straight path segments defined by the geographic location and altitude of the end points is formed according to the relationship:

$$\gamma = K_h h_\epsilon/V - \left( \frac{(-h_\epsilon + \tau \dot{h}) S}{\tau S + 1} \right) /V$$

or $$\gamma = K_h h_\epsilon/V - \left( \frac{-h_\epsilon S + \tau \ddot{h}}{\tau S + 1} \right) /V$$

where $h_\epsilon$ = the linear deviation of the aircraft from the desired flight path, $K_h$ = constant selected to provide suitable path capture dynamics, V = airspeed or inertially smoothed airspeed, $\dot{h}$ = aircraft vertical speed, $\ddot{h}$ = aircraft vertical acceleration, $\tau$ = filter time constant, and S = Laplace operator.

34. The system of claim 33 in which said flight path angle error computation is carried out simultaneously for a current leg of the vertical path and a next upcoming leg and whereby reversion of the path control from the current leg to the upcoming leg is triggered by the sign of $\gamma_\epsilon$ computation for the upcoming leg becoming opposite in sign to the incremental flight path angle command signal $\Delta\gamma_c$ or $\Delta h_c$ where $\Delta\gamma_c = K_h \cdot h_{68}/V = \Delta\dot{h}_c/V$.

35. The system of claim 27 in which said $\dot{h}_c$ signal is rate limited to a value $\dot{h}_{MAX}$, where $\dot{h}_{MAX}$ is a constant representing the maximum allowable vertical acceleration.

36. The system of claim 35 in which the acceleration command signal $\dot{V}_c$ is rate limited to a value $g\dot{h}_{MAX}/V$, where g represents the gravity constant, $\dot{h}_{MAX}$ represents the maximum allowable vertical acceleration and V represents the aircraft's airspeed or inertially smoothed airspeed, providing energy transfer capability from speed to altitude or vice versa without thrust response.

37. The system of any one of claims 3 through 5 in which said means for providing said $\gamma$ signal, representative of the aircraft's flight path angle comprises:
means for providing a signal $\dot{h}$ representative of the sinkrate of the aircraft;
means for providing a signal representative of the true altitude $h_R$ of the aircraft relative to the terrain;
means for limiting said $h_R$ altitude signal to a value corresponding to the altitude at which the landing flare is to start;
means for amplifying said sinkrate signal by a factor $\tau_F$, summing it with the $h_R$ signal output from said signal limiting means and processing the combined signal through a high pass filter having the transfer function $S/(\tau_F S+1)$ where S represents the Laplace operator and $\tau_F$ represents the filter time constant;
means for passing said $\dot{h}$ signal through a switch to a lag filter only when the terrain altitude signal $h_R$ is greater than said terrain altitude signal limit, said lag filter having a transfer function $1/(\tau_F S+1)$;
means for combining the output of said high pass filter and said lag filter to form a derived $\dot{h}$ signal, which is referenced to the terrain during the flare maneuver;
means for providing an inertially smoothed true airspeed signal; and
means for dividing said derived $\dot{h}$ signal by said inertially smoothed true airspeed signal to produce said $\gamma$ signal.

38. The system of claim 37 further including:
means for combining said derived $\dot{h}$ signal with an $\dot{h}_{BIAS}$ signal representative of the desired sinkrate at touchdown;
means for providing a signal representative of ground speed $V_G$ and dividing said $V_G$ signal by said inertially smoothed true airspeed signal to form a speed ratio signal;
means for amplifying said combined $\dot{h}$ signal by a gain factor K and multiplying the resulting signal by said speed ratio signal to produce a flare command signal;
switching means for replacing the $\gamma_\epsilon$ signal used in developing thrust and elevator commands with said flare command signal at the instant the terrain altitude signal $h_R$ drops below said terrain altitude signal limit; and
switching means for replacing the $\dot{V}_c$ signal used in developing thrust and elevator commands with a $\dot{V}_c - BIAS$ signal at the instant the terrain altitude signal $h_R$ drops below said terrain altitude signal limit to develop coordinated elevator and throttle retard commands for controlling the landing flare maneuver.

39. The system of any one of claims 2 through 5 wherein said means for providing a signal $\dot{V}$ representative of the longitudinal acceleration signal comprises:
means for providing a signal representative of the thrust T;
means for providing a signal representative of the aircraft weight W;
means for providing a signal representative of the true airspeed $V_{TRUE}$; and
signal processing means for developing a signal $\hat{\dot{V}}$ or $\hat{\dot{V}}/g$ representative of the longitudinal acceleration according to the relationship $$\hat{\dot{V}} = \frac{g\left\{\left(\frac{T}{W} - \gamma\right) + \frac{V_{TRUE}}{\dot{V}}\right\}\tau_{\dot{V}}S}{\tau_{\dot{V}}S + 1}$$

or $$\frac{\hat{\dot{V}}}{g} = \frac{\left\{\left(\frac{T}{W} - \gamma\right) + \frac{V_{TRUE}}{g\dot{V}}\right\}\tau_{\dot{V}}S}{\tau_{\dot{V}}S + 1}$$

where:
g = acceleration due to gravity
$V_{TRUE}$ = true airspeed
$\gamma$ = flight path angle
T = net thrust
W = aircraft weight
$\tau_{\dot{V}}$ = filter time constant, and
S = Laplace operator.

40. The system of any one of claims 3 through 5 in which said means for developing a longitudinal acceleration command signal $\dot{V}_c$ comprises:
means for providing a speed deviation signal $V_\epsilon$ of the aircraft relative to the desired speed and means for normalizing said speed deviation signal $V_\epsilon$ into the longitudinal acceleration command signal $\dot{V}_c$, according to the relationship $\dot{V}_c = K_V V_\epsilon$ where $K_V$ is a constant selected to provide suitable speed response dynamics.

41. The system of claim 40 wherein the gains $K_h$ and $K_V$ are selected equal in magnitude to provide equal weighting of altitude and speed errors in terms of energy.

42. The system of claim 41 wherein said speed deviation signal $V_\epsilon$ of the aircraft relative to the desired speed represents deviation in terms of true airspeed.

43. The system of claim 40 in which the means for providing a speed deviation signal $V_\epsilon$ includes means for automatically selecting from:
(a) a first means providing $V_{ESEL}$, representing the speed deviation of the aircraft relative to a pilot selected speed command,
(b) a second means providing $V_{MIN\epsilon}$, representing the speed deviation of the aircraft relative to a minimum safe speed,
(c) a third means providing $V_{MAX\epsilon}$ representing the speed deviation of the aircraft relative to a maximum safe speed,
with said selection governed by:

$V_\epsilon = V_{MIN\epsilon}$ if $V_{\epsilon SEL} \leqq V_{MIN\epsilon}$ $V_\epsilon = V_{MAX\epsilon}$ if $V_{\epsilon SEL} \geqq V_{MAX\epsilon}$ $V_\epsilon = V_{\epsilon SEL}$ if $V_{MAX\epsilon} \leqq V_{\epsilon SEL} \leqq V_{MIN\epsilon}$ where the error signals $V_\epsilon$, $V_{\epsilon SEL}$, $V_{MIN\epsilon}$, $V_{MAX\epsilon}$ are positive if the associated speed command exceeds the actual speed.

44. The system of claim 43 wherein said means for providing $V_{\epsilon SEL}$ comprises:
   means for providing a signal $V_{CAS}$ representative of the calibrated airspeed of the aircraft;
   means responsive to pilot manipulation for selecting the desired calibrated airspeed $V_{CASc}$ and providing a representative signal output thereof; and
   means for developing the calibrated airspeed error by subtracting said $V_{CAS}$ signal from said $V_{CASc}$ signal and converting said calibrated airspeed error into a true airspeed error $V_{\epsilon SEL}$ by multiplication with a calibration factor $K_{ALT}$ which is a predetermined function altitude.

45. The system of claim 43 wherein said means for providing $V_{\epsilon SEL}$ comprises:
   means for providing a MACH number signal representative of the ratio of the true airspeed of the aircraft and the speed of sound;
   means responsive to pilot manipulation for selecting the desired MACH number command $MACH_c$ and providing a signal output representative thereof;
   means for providing a signal $V_{TRUE}$ representative of the true airspeed of the aircraft;
   means for developing a signal a representative of the speed of sound by dividing said true airspeed signal $V_{TRUE}$ by said MACH signal;
   means for converting said $MACH_c$ signal into a true airspeed command signal $V_{Tc}$ by multiplying said $MACH_c$ signal by said speed of sound signal a; and
   means for developing the true airspeed error signal $V_{\epsilon SEL}$ by subtracting said true airspeed signal $V_{TRUE}$ from said true airspeed command signal $V_{Tc}$.

46. The system of claim 43 wherein said means for providing $V_{MIN}$ comprises:
   means for developing a signal $\alpha_{MAX}$ representative of the maximum safe angle of attack for the aircraft;
   means for providing a signal $\alpha$ representative of the actual angle of attack of the aircraft;
   means for providing a factor $K_\alpha$ representative of the ratio of the steady state change in speed per unit change in angle of attack;
   means for forming the angle of attack error $\alpha_\epsilon$ by subtracting said $\alpha$ signal from said $\alpha_{MAX}$ signal and normalizing said $\alpha_\epsilon$ signal into an equivalent airspeed error signal $V_{\epsilon\alpha}$ by multiplying it with said factor $K_\alpha$ and processing the resulting signal through a low pass filter to provide the long term component of the $V_{MIN\epsilon}$ signal;
   means for providing a signal $V_{TRUE}$ representative of the true airspeed;
   means for providing and processing a flap position signal to develop a signal $\Delta V_c$ representative of the minimum desired speed increment as a function of the aircraft's flap position change;
   means for combining said $V_{TRUE}$ signal and said $\Delta V_c$ signal and processing the resulting signal in a high pass filter to provide a short term component of said $V_{MIN\epsilon}$ signal; and
   means for combining said signals representative of the long term component of $V_{MIN\epsilon}$ and the short term component of $V_{MIN\epsilon}$ to form the total $V_{MIN\epsilon}$ signal representative of the aircraft airspeed deviation relative to the minimum safe speed.

47. The system of claims 3 through 5 wherein said flight path angle command signal $\gamma_c$ is rate limited to a value of $\ddot{h}_{LIMIT}/V$, where $\ddot{h}_{LIMIT}$ is a constant representing a maximum allowable vertical acceleration and V represents airspeed or inertially smoothed airspeed.

48. The system of any one of claims 3 through 5 in which the acceleration command signal $\dot{V}_c$ is rate limited to a value $g\ddot{h}_{MAX}/V$, where g represents the gravity constant, $\ddot{h}_{MAX}$ represents the maximum allowable vertical acceleration and V represents the aircraft's airspeed or inertially smoothed airspeed, providing energy transfer capability from speed to altitude or vice versa without thrust response.

49. The system of claim 5 including:
   means for providing the rated thrust limit of the engine;
   means for limiting the engine thrust to a predetermined upper limit and developing a FORWARD LIMIT discrete signal when the command thrust reaches the upper thrust limit;
   means for limiting the engine thrust to a predetermined lower limit value and developing an AFT LIMIT discrete signal when the commanded thrust reaches this lower limit;
   means for removing the flight path angle error signal $\gamma_\epsilon = \gamma_c - \gamma$ input to the elevator command computation when either the FORWARD LIMIT or AFT LIMIT discrete signal is true;
   means for limiting the longitudinal acceleration command signal $\dot{V}_c$ whenever the FORWARD LIMIT discrete signal is true, to a value $\dot{V}_{cLIM} = \dot{V} - g\gamma_\epsilon$ or $\dot{V}_{cLIM} = K(\dot{V} + g\gamma)$ whichever is greater and limiting the longitudinal acceleration command signal $\dot{V}_c$ whenever the AFT LIMIT discrete is true, to a value $\dot{V}_{cLIMIT} = \dot{V} - g\gamma_\epsilon$ or $\dot{V}_{cLIM} = K_2(\dot{V} + g\gamma)$ whichever is less, the values of $K_1$ and $K_2$ selected between 1.0 and 0 to prioritize either speed or flight path command execution.

50. The system of claim 49 wherein said means for limiting the engine thrust comprises:
   means for converting the incremental net thrust command signal $\Delta T_c$ into an incremental variable $\Delta EPR_c$ (incremental engine pressure ratio command) or $\Delta N_{1c}$ (incremental fan speed) by which the engine thrust can be controlled readily;
   means for providing a signal $EPR_{IDLE}$ or $N_{1IDLE}$ representative of the engine control variable at idle, means for combining said incremental engine control variable $\Delta EPR_c$ or $N_{1c}$ with said $EPR_{IDLE}$ or $N_{1IDLE}$ signal for providing an absolute engine control command signal $EPR_c$ or $N_{1c}$;
   means for providing a signal $EPR_{LIM}$ or $N_{1LIM}$ representative of the maximum allowable value of the engine control variable;
   means for feeding back the difference between said $EPR_{LIMIT}$ or $N_{1LIMIT}$ and said $EPR_c$ or $N_{1c}$ signal with high gain to the input of the thrust command integrator if said $EPR_c$ or $N_{1c}$ exceeds said $EPR_{LIMIT}$ or $N_{1LIMIT}$ signal, so as to limit the value of $EPR_c$ or $N_{1c}$ to said $EPR_{LIMIT}$ or $N_{1LIMIT}$; and means for controlling the engine thrust to make the actual engine pressure ratio EPR or fan speed $N_1$ track the command signal $EPR_c$ or $N_1$.

51. The system of claim 50 wherein said means for converting the incremental net thrust command signal $\Delta T_c$ into an incremental engine control variable $\Delta EPR_c$ or $\Delta N_1$ comprises:

means for providing a signal $\delta$, representative of the ratio of the atmospheric pressure at aircraft altitude and the sea level atmospheric pressure and dividing said $\Delta T_c$ signal by said $\delta$ signal to provide a normalized incremental thrust command signal;

means for converting said normalized incremental thrust command signal into the incremental thrust control command signal $\Delta_{EPR_c}$ (incremental engine pressure ratio) or $N_1$ (incremental fan speed); and means for controlling the engine thrust so as to make the actual incremental EPR or $N_1$ track $\Delta EPR_c$ or $\Delta N_1$.

52. The system of claim 51 wherein said means for controlling the engine thrust to said $\Delta EPR_c$ or $N_{1c}$ comprises:

means for providing the actual engine EPR or $N_1$;

means for providing a signal $EPR_{IDLE}$ or $N_{1IDLE}$ representative of the value of the engine control variable at idle;

means for subtracting said $EPR_{IDLE}$ or $N_{1IDLE}$ signal from the sum of said EPR or $N_1$ signal and said $\Delta EPR_c$ signal to form an EPR error signal;

means for converting said EPR error signal into a trim throttle position command signal;

means for converting said $\Delta EPR_c$ signal into a target throttle position command signal;

means for combining said trim throttle position command signal, said target throttle position command signal and an idle bias signal to form a total throttle position command signal; and means for controlling the actual throttle position to said total throttle position command signal.

* * * * *